United States Patent
Little et al.

(10) Patent No.: US 11,861,137 B2
(45) Date of Patent: Jan. 2, 2024

(54) VEHICULAR INCIDENT REENACTMENT USING THREE-DIMENSIONAL (3D) REPRESENTATIONS

(71) Applicant: State Farm Mutual Automobile Insurance Company, Bloomington, IL (US)

(72) Inventors: Rebecca A. Little, Mesa, AZ (US); Christopher Robert Galante, Mesa, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 17/469,946

(22) Filed: Sep. 9, 2021

(65) Prior Publication Data

US 2022/0075504 A1 Mar. 10, 2022

Related U.S. Application Data

(60) Provisional application No. 62/706,757, filed on Sep. 9, 2020.

(51) Int. Cl.
G06F 3/04815 (2022.01)
G06T 19/00 (2011.01)

(52) U.S. Cl.
CPC ........ *G06F 3/04815* (2013.01); *G06T 19/003* (2013.01); *G06T 19/006* (2013.01)

(58) Field of Classification Search
CPC .... G06F 3/04815; G06F 3/011; G06T 19/003; G06T 19/006; G06T 19/20; G06T 2219/2004
See application file for complete search history.

(56) References Cited

U.S. PATENT DOCUMENTS 8,624,924 B2 1/2014 Dobbins et al.
9,057,746 B1 6/2015 Houlette et al.
(Continued)

FOREIGN PATENT DOCUMENTS

CN 111626536 9/2020
CN 113138558 7/2021
(Continued)

OTHER PUBLICATIONS

Friedman, E. (Feb. 2019). Using AR/VR for assurance in insurance. BrainXChange. Retrieved from https://brainxchange.com/using-ar-vr-for-assurance-in-insurance/.

(Continued)

Primary Examiner — Charles Tseng
(74) Attorney, Agent, or Firm — Lee & Hayes, P.C.

(57) ABSTRACT

Described herein are techniques to facilitate vehicular incident reenactment using three-dimensional (3D) representations. The techniques include presenting an image including 3D representations of one vehicle and one non-vehicular object related to a vehicular incident. The operations further include providing a message that requests manipulation of the 3D representations to reenact the vehicular incident. The operations further include receiving input and generating a 3D reenactment of the vehicular incident that includes the 3D representations of the at least one vehicle and at least one non-vehicular object.

20 Claims, 25 Drawing Sheets

(56) References Cited

U.S. PATENT DOCUMENTS

| | | |
|---|---|---|
| 9,122,321 B2 | 9/2015 | Perez et al. |
| 9,152,737 B1 | 10/2015 | Micali et al. |
| 9,342,610 B2 | 5/2016 | Liu et al. |
| 9,443,195 B2 | 9/2016 | Micali et al. |
| 9,609,003 B1 | 3/2017 | Chmielewski et al. |
| 9,691,189 B1* | 6/2017 | Creath .................... G07C 1/00 |
| 9,699,529 B1 | 7/2017 | Petri et al. |
| 9,739,813 B2 | 8/2017 | Houlette et al. |
| 9,798,979 B2 | 10/2017 | Fadell et al. |
| 9,800,958 B1 | 10/2017 | Petri et al. |
| 9,886,953 B2 | 2/2018 | Lemay et al. |
| 9,942,630 B1 | 4/2018 | Petri et al. |
| 10,032,225 B1 | 7/2018 | Fox et al. |
| 10,102,584 B1 | 10/2018 | Devereaux et al. |
| 10,137,984 B1 | 11/2018 | Flick |
| 10,142,394 B2 | 11/2018 | Chmielewski et al. |
| 10,198,771 B1 | 2/2019 | Madigan et al. |
| 10,296,978 B1 | 5/2019 | Corder et al. |
| 10,311,302 B2 | 6/2019 | Kottenstette et al. |
| 10,332,059 B2 | 6/2019 | Matsuoka |
| 10,366,288 B1 | 7/2019 | Kottenstette et al. |
| 10,469,282 B1 | 11/2019 | Konrardy et al. |
| 10,586,177 B1 | 3/2020 | Choueiter et al. |
| 10,643,072 B2 | 5/2020 | Kottenstette et al. |
| 10,664,922 B1 | 5/2020 | Madigan et al. |
| 10,699,346 B1 | 6/2020 | Corder et al. |
| 10,699,348 B1 | 6/2020 | Devereaux et al. |
| 10,719,966 B1 | 7/2020 | Davis et al. |
| 10,735,829 B2 | 8/2020 | Petri et al. |
| 10,740,691 B2 | 8/2020 | Choueiter et al. |
| 10,750,252 B2 | 8/2020 | Petri et al. |
| 10,776,883 B2 | 9/2020 | Labrie et al. |
| 10,796,557 B2 | 10/2020 | Sundermeyer et al. |
| 10,802,477 B1 | 10/2020 | Konrardy et al. |
| 10,803,532 B1 | 10/2020 | Brandmaier et al. |
| 10,804,700 B2 | 10/2020 | Cohen et al. |
| 10,818,105 B1 | 10/2020 | Konrardy et al. |
| 10,907,844 B2 | 2/2021 | Ribbich et al. |
| 11,003,334 B1 | 5/2021 | Conway et al. |
| 11,023,961 B1 | 6/2021 | Gore et al. |
| 11,087,550 B2 | 8/2021 | Lyren |
| 11,100,594 B1 | 8/2021 | West et al. |
| 11,151,378 B2 | 10/2021 | Kottenstette et al. |
| 11,164,257 B1 | 11/2021 | Devereaux et al. |
| 11,210,552 B2 | 12/2021 | Kossyk et al. |
| 11,222,426 B2 | 1/2022 | Richter et al. |
| 11,232,150 B2 | 1/2022 | Vianello et al. |
| 11,232,873 B1 | 1/2022 | Aspro et al. |
| 11,277,465 B2 | 3/2022 | Chmielewski et al. |
| 11,314,214 B2 | 4/2022 | Rexach et al. |
| 11,348,193 B1 | 5/2022 | Konrardy et al. |
| 11,367,265 B2 | 6/2022 | Vianello et al. |
| 11,417,212 B1 | 8/2022 | Farooqui et al. |
| 11,475,626 B2 | 10/2022 | Holzer et al. |
| 2003/0046689 A1 | 3/2003 | Gaos |
| 2009/0213114 A1 | 8/2009 | Dobbins et al. |
| 2009/0265193 A1 | 10/2009 | Collins et al. |
| 2009/0326989 A1 | 12/2009 | Schmitt et al. |
| 2012/0154557 A1 | 6/2012 | Perez et al. |
| 2013/0050258 A1 | 2/2013 | Liu et al. |
| 2014/0052480 A1 | 2/2014 | Bell et al. |
| 2014/0266669 A1 | 9/2014 | Fadell et al. |
| 2015/0061859 A1 | 3/2015 | Matsuoka et al. |
| 2015/0301596 A1 | 10/2015 | Qian et al. |
| 2015/0347910 A1 | 12/2015 | Fadell et al. |
| 2018/0047395 A1 | 2/2018 | Sommers et al. |
| 2018/0256962 A1* | 9/2018 | Kudirka ............. A63B 71/0669 |
| 2018/0356523 A1 | 12/2018 | England et al. |
| 2019/0050133 A1* | 2/2019 | Grossman ............. G06T 19/003 |
| 2019/0139317 A1 | 5/2019 | Bilbrey et al. |
| 2019/0251520 A1 | 8/2019 | Bentley et al. |
| 2020/0076947 A1 | 3/2020 | Deole |
| 2020/0111264 A1* | 4/2020 | Kuruvilla ................ G06T 19/20 |
| 2020/0219198 A1* | 7/2020 | Pearce ................... G07C 5/008 |
| 2021/0035153 A1 | 2/2021 | Cohen et al. |
| 2021/0279811 A1 | 9/2021 | Waltman et al. |
| 2021/0312789 A1 | 10/2021 | Linn |
| 2022/0101275 A1 | 3/2022 | Aspro et al. |
| 2022/0366689 A1 | 11/2022 | Little |

FOREIGN PATENT DOCUMENTS

| | | |
|---|---|---|
| JP | 2003157357 | 5/2003 |
| KR | 20150129845 | 11/2015 |
| WO | WO2014159131 | 10/2014 |
| WO | WO2015192117 A1 | 12/2015 |
| WO | WO2016081511 | 5/2016 |
| WO | WO2018036113 | 3/2018 |
| WO | WO2021087185 | 5/2021 |

OTHER PUBLICATIONS

Office Action for U.S. Appl. No. 16/890,865, dated Apr. 8, 2021, Little, "Insurance Inventory and Claim Generation", 16 Pages.

Office Action for U.S. Appl. No. 16/890,883, dated Nov. 17, 2021, Little, "Interactive Insurance Inventory and Claim Generation", 19 pages.

Office action for U.S. Appl. No. 16/890,883, dated Mar. 25, 2021, Little, "Interactive Insurance Inventory and Claim Generation", 15 pages.

Wang, I., Smith, J., & Ruiz, J. (May 2019). Exploring virtual agents for augmented reality. Proceedings of the 2019 CHI Conference on Human Factors in Computing Systems, Paper No. 281. doi: 10.1145/3290605.3300511. See highlighted sections.

Xiang, Y. (Mar. 2016). An augmented reality interface for supporting remote insurance claim assessment. Research Repository, University of Canterbury. Retrieved from https://ir.canterbury.ac.nz/handle/10092/12296, 73 pages.

Office Action for U.S. Appl. No. 16/890,865, dated Dec. 22, 2021, Little, "Insurance Inventory and Claim Generation ", 21 pages.

Office Action for U.S. Appl. No. 16/890,883, dated Jul. 9, 2021, Little, "Interactive Insurance Inventory and Claim Generation", 22 pages.

Office Action for U.S. Appl. No. 16/890,865, dated Sep. 1, 2021, Little, "Insurance Inventory and Claim Generation ", 17 pages.

Office Action for U.S. Appl. No. 17/335,690, dated Aug. 23, 2023, Rebecca A. Little, "Insurance Claim Generation", 17 pages.

Office Action for U.S. Appl. No. 17/815,481, dated Jul. 27, 2023, Little, "Insurance Inventory and Claim Generation", 20 pages.

Office Action for U.S. Appl. No. 17/808,434, dated Oct. 30, 2023, Rebecca A. Little, "Interactive Insurance Inventory and Claim Generation", 35 pages.

* cited by examiner

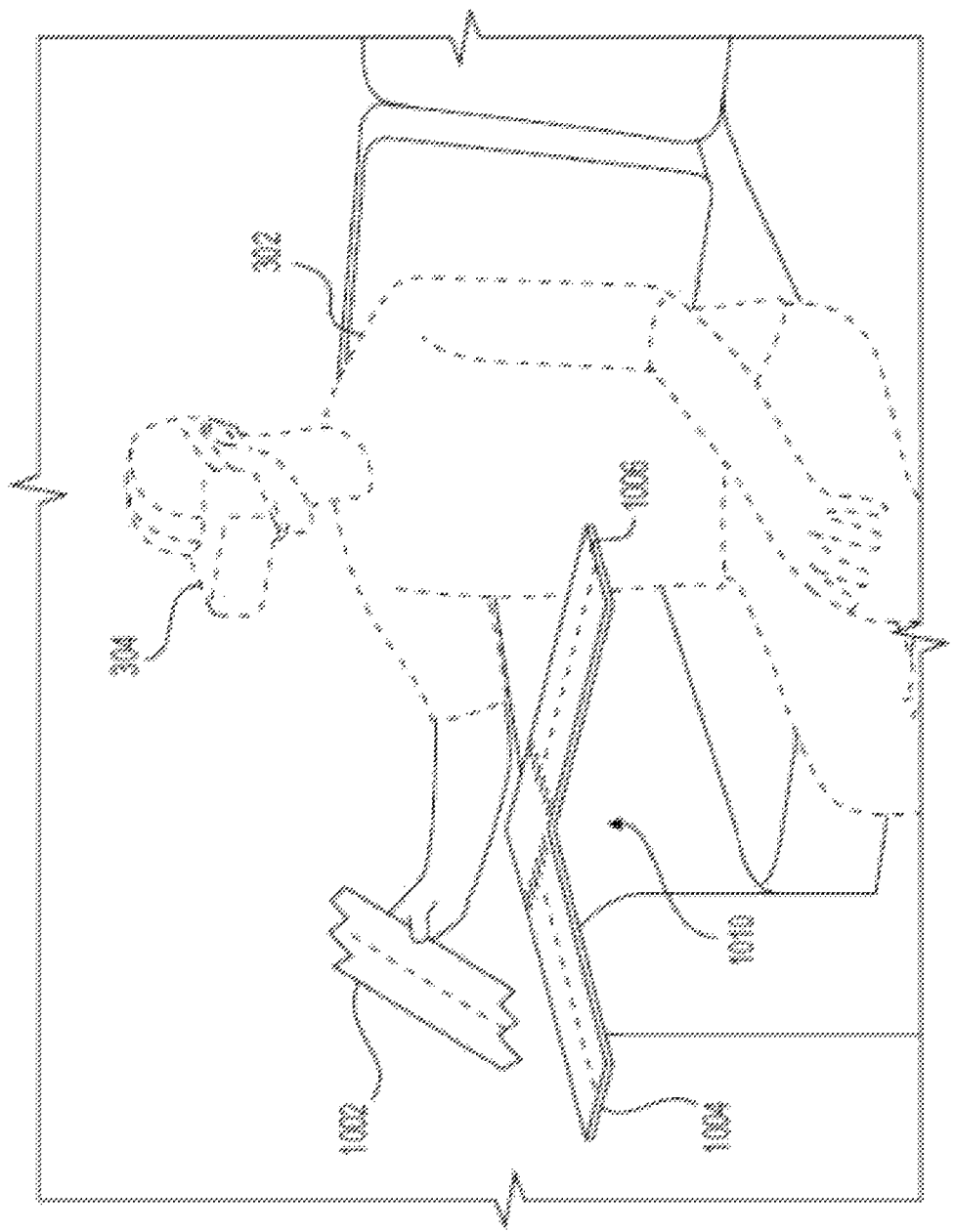
FIG. 10B

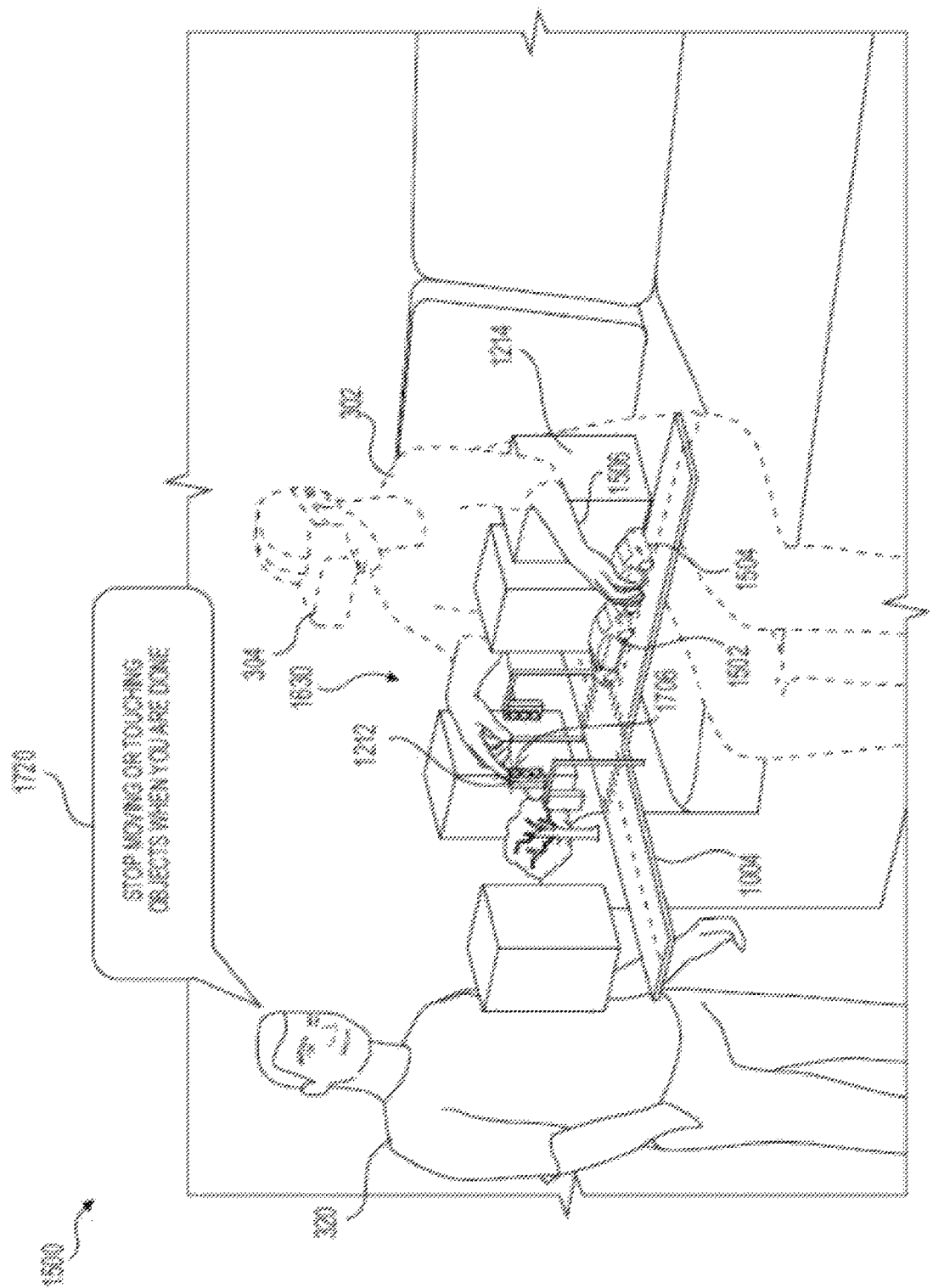

VEHICULAR INCIDENT REENACTMENT USING THREE-DIMENSIONAL (3D) REPRESENTATIONS

CROSS-REFERENCE TO RELATED APPLICATIONS

This application is a Nonprovisional of and claims priority to U.S. Provisional Patent Application No. 62/706,757, filed on Sep. 9, 2020, the entire disclosure of which is hereby incorporated herein by reference.

BACKGROUND

In the wake of an automobile accident, there are many things that a driver may do to document the details for submitting a claim for coverage to the insurance company. For this discussion, the driver of one of the automobiles involved in an accident is presumed to be a policyholder of an insurance policy that potentially covers such accidents.

There are many conventional digital tools that may provide post-accident guidance to policyholder. Often, these digital tools are applications ("apps") on a touchscreen portable mobile device (e.g., smartphone or tablet computer).

For example, following an automobile accident, the policyholder opens a conventional app on their touchscreen portable mobile device and asks for post-accident guidance. With the conventional app, the policyholder may access their insurance information, file a claim, upload photographs (e.g., vehicle damage) and documents (e.g., insurance information of another vehicle), summon roadside assistance, gather witness information, and check-off items on an accident checklist. Indeed, some conventional apps may allow the policyholder to provide written or audio details of the scene of the incident and the movements of the vehicles or pedestrians involved.

However, none of these conventional apps allow the policyholder to reconstruct or reenact the accident. These conventional apps require the user to touch a touchscreen or keyboard. None of them allow for hands-free interaction.

SUMMARY

Techniques described herein employ virtual reality (VR) and/or mixed reality (MR) and/or augmented reality (AR) tools to assist a user such as a policyholder to facilitate vehicular incident reenactment using three-dimensional (3D) representations. In addition, techniques described herein employ VR and/or mixed or AR tools to assist the user in preparing a report of damage to their covered vehicle after an incident, such as to submit a claim for damage to an insurance company. A virtual assistant may assist the user, for example, much as if an actual assistant were physically present with the user.

This disclosure describes, in one aspect, techniques to facilitate vehicular incident reenactment using three-dimensional (3D) representations. The techniques include presenting, on a display of an electronic device, an image including three-dimensional (3D) representations of at least one vehicle involved in a vehicular incident, and at least one non-vehicular object proximate of the vehicular incident. The techniques further include providing a message via the electronic device. The message requests an input comprising manipulation of the 3D representations of the at least one non-vehicular object and the at least one vehicle, via the display of the electronic device, as a reenactment of the vehicular incident. The techniques further include receiving a first input from the electronic device and based at least in part on the message. The first input is received via the electronic device and generating a 3D reenactment of the vehicular incident that includes the 3D representations of the at least one vehicle and at least one non-vehicular object and based at least in part on the first input.

This disclosure describes, in another aspect, a system, comprising one or more processors and memory coupled to the one or more processors. The memory stores instructions executable by the one or more processors to perform operations. The operations include presenting, on a display of an electronic device, an image including three-dimensional (3D) representations of at least one vehicle involved in a vehicular incident. The operations further include providing a message via the electronic device. The message requests an input comprising manipulation of the 3D representations of the at least one vehicle, via the display of the electronic device, as a reenactment of the vehicular incident. The operations further include receiving a first input from the electronic device and based at least in part on the message. The first input is received via the electronic device and generating a 3D reenactment of the vehicular incident that includes the 3D representations of the at least one vehicle and based at least in part on the first input.

This disclosure describes, in another aspect, one or more computer-readable media storing instructions that, when executed by one or more processors of at least one device, configure the at least one device to perform operations. The operations include presenting, on a display of an electronic device, an image including three-dimensional (3D) representations of at least one vehicle involved in a vehicular incident. The operations further include providing a message via the electronic device. The message requests an input comprising manipulation of the 3D representations of the at least one vehicle, via the display of the electronic device, as a reenactment of the vehicular incident. The operations further include receiving a first input from the electronic device and based at least in part on the message. The first input is received via the electronic device and generating a 3D reenactment of the vehicular incident that includes the 3D representations of the at least one vehicle and based at least in part on the first input.

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
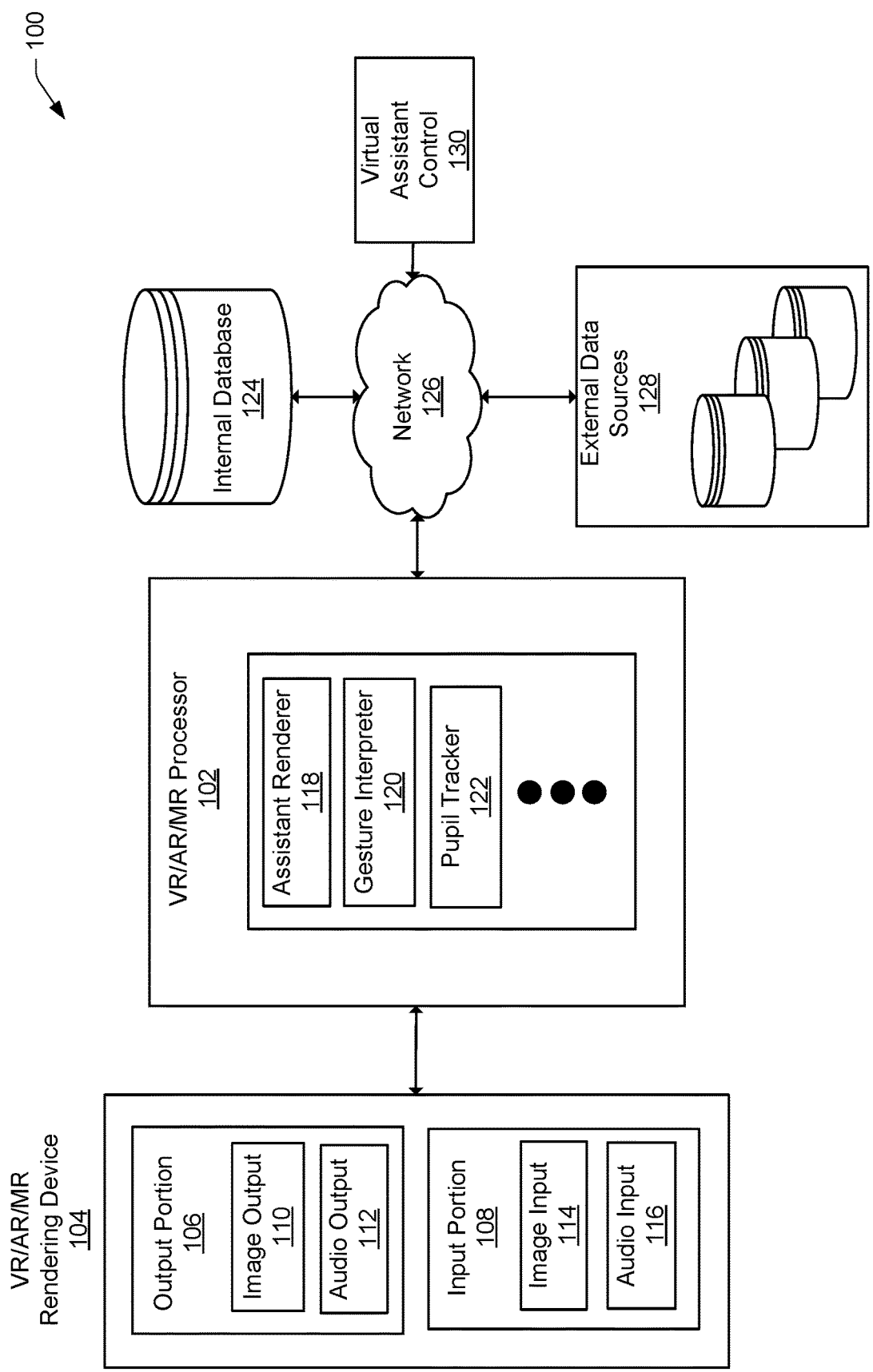
FIG. 1 schematically illustrates an example system in which the described techniques may operate.

FIG. 1 schematically illustrates an example system 100 in which the described techniques may be utilized. Using the techniques in the system 100, a user may produce a reenactment using 3D representations of a vehicular incident.

Unless the context indicates otherwise, a vehicular incident, as used herein, refers to an event, or occurrence, involving at least one vehicle that inflicts or potentially inflicts damage to the vehicle, another vehicle, passengers of vehicles, pedestrian, and/or property. The common term "automobile accident" is an example of a vehicular incident. Herein, a vehicular incident may be more simply called just an incident.

The system 100 employs virtual reality (VR) and/or mixed reality (MR) and/or augmented reality (AR) tools to enable a user (such as a policyholder) to facilitate vehicular incident reenactment using three-dimensional (3D) representations. In addition, the system 100 employs VR and/or mixed or AR tools to assist the user in preparing a report of damage to their covered vehicle after an incident, such as to submit a claim for damage to an insurance company.

In system 100, a Virtual Reality/Augmented Reality/Mixed Reality (VR/AR/MR) processor 102 is provided. Virtual reality (VR) replaces a view of an actual environment, an actual reality, with a view of a virtual environment, a virtual reality. Augmented reality (AR) provides annotations onto a view of an actual environment. Mixed reality (MR) provides a view of an actual environment mixed with a virtual environment. Mixed reality can include, for example, overlaying spatially registered virtual objects on top of a user's direct view of an actual environment. While VR, AR and MR are sometimes treated as discrete concepts, a line between them in practice may be blurred. In the context of the described techniques, devices utilizing one, some, or all of these concepts may be employed, alone or in combination with each other.

The VR/AR/MR processor 102 may include, for example, one or more processors programmed or otherwise configured to interoperate with a VR/AR/MR rendering device 104. The VR/AR/MR processor 102 and the VR/AR/MR rendering device 104 may be configured for two-way communication, which may be across a network in some examples. The VR/AR/MR rendering device 104 may, for example, include a device such as a flat-screen display device via which a mix of a real environment and a virtual environment may be displayed simultaneously, such as in a superimposed manner. In some examples, the VR/AR/MR rendering device 104 is a headset, such as goggles, glasses, or a heads-up display, designed to be worn on or situated relative to the head of a user such that a display of the VR/AR/MR rendering device 104 is disposed in front of the eyes of the user. A heads-up display is a transparent display that presents data without requiring a user to look away from the actual environment the user is viewing.

In the example system 100 shown in FIG. 1, the VR/AR/MR rendering device 104 includes an output portion 106 and an input portion 108. The output portion 106 includes an image output portion 110 and an audio output portion 112. The image output portion 110 may, for example, be a display device such as an LED or LCD display screen. In some examples, the image output portion 110 is a display device that is configured to display an image that appears to be three-dimensional to a user of the VR/AR/MR rendering device 104. The audio output portion 112 may, for example, be one or more speakers such as contained within a headphone to be worn in, over or around one or both ears of the user.

Referring still to the example system 100 shown in FIG. 1, the input portion 108 includes an image input portion 114 and an audio input portion 116. The image input portion 114 may include one or more cameras and/or one or more other visual detection devices. The image input portion 114, in some examples, uses infrared (IR) detection to generate a point-cloud representation of an actual environment. In another example, emission and detection are utilized to generate a point-cloud representation of an actual environment, such as Light Detection and Ranging (LIDAR), a sensing method that uses light in the form of a pulsed laser to measure ranges. A point cloud is a set of data points in a multi-dimensional space, typically a three-dimensional space. The image input portion 114 may be configured to generate pupil data based on a position of a user's eyes. The audio input portion 116 may include, for example, one or more microphones and/or one or more other listening devices.

In some examples, the output portion 106 and input portion 108 are not configured to be disposed in a single device. Furthermore, the image output portion 110 and audio output portion 112 may not be disposed in a single device. Likewise, the image input portion 114 and audio input portion 116 may not be disposed in a single device. As just one example, the audio output portion 112 and the audio input portion 116 may utilize the functionality of a smart speaker device that the user already has within the actual environment.

Referring still to FIG. 1, as mentioned above, the VR/AR/MR processor 102 may include, for example, one or more processors programmed or otherwise configured to communicate with and interoperate with the VR/AR/MR rendering device 104. In the example system 100 shown in FIG. 1, the VR/AR/MR processor 102 includes a virtual assistant renderer 118 programmed or otherwise configured to render a virtual assistant on the image output portion 110.

A virtual assistant may assist the user, for example, much as if an actual assistant were physically present with the user. This can help a user to maximize the use of their insurance coverage. The virtual assistant may, for example, be a virtual visual representation having a humanoid appearance. In other examples, other appearances may be used, such as a floating robotic ball.

As discussed later, the virtual assistant may guide the user through the gathering of relevant information at or near a scene of the incident. In addition, the virtual assistant may guide the user to reconstruct the scene and reenact the incident using 3D representations of vehicles and non-vehicular objects of the incident.

The VR/AR/MR processor 102 may also include a gesture interpreter 120. The gesture interpreter 120 may be programmed or otherwise configured to interpret one or more gestures of a user of the VR/AR/MR rendering device 104. For example, gestures of the user may include hand or arm movements of the user, eye movements or other non-verbal communication by which the user communicates using visible bodily actions. The VR/AR/MR processor 102 may also include a pupil tracker 122, which is programmed or otherwise configured to determine, based on pupil data, the location in a displayed environment of the user's gaze. The VR/AR/MR processor 102 may include other functionality not shown in FIG. 1.

The VR/AR/MR processor 102 in the example system 100 is connected to an internal database 124 via a network 126. The internal database 124 may include, for example, a record of video, images, and audio data received from the output portion 106 of the VR/AR/MR rendering device 104, 3D representations of various vehicles and non-vehicular objects, specific information about the vehicles covered by each policyholder.

Unless the context indicates otherwise, a vehicle, as used herein, refers to a thing used for transporting people or goods, especially across land or a roadway. Examples of a vehicle include wagons, bicycles, automobiles, motorcycles, cars, trucks, sports utility vehicles (SUV), trains, trams, buses, watercraft, amphibious craft, and the like.

As the label implies, a non-vehicular object is a thing or feature that is not a vehicle. The non-vehicular objects may be, for example, non-vehicular things or features that may be that may be proximate an vehicular incident. For example, a non-vehicular object may be a road, a sidewalk, a traffic light, traffic sign, building, parking lot, railroad track, person, pole, advertisement sign, lane marker, intersection, vegetation, construction materials, construction equipment, walls, landmarks, and the like.

Depending upon the context, an object may be real or virtual. The virtual object represents the real object. For example, a 3D representation of a truck is a virtual object that represents an actual truck. Unless the context indicates otherwise, an object refers to a non-vehicular object herein.

The VR/AR/MR processor 102 in the example system 100 shown in FIG. 1 also communicates via the network 126 to one or more external data sources 128. The external data sources 128 may include, for example, global positioning systems (GPS), roadmaps, and satellite maps. These may be consulted for reference while reenacting the incident at a mapped location. For example, the satellite map of the location of the incident may be superimposed with the 3D representations being placed and moved by the user during the construction of the reenactment of the incident.

The example system 100 shown in FIG. 1 also includes a virtual assistant control system 130, which communicates via the network 126 with the VR/AR/MR processor 102. The virtual assistant control system 130 may operate automatically and/or responsive to human input. For example, the virtual assistant control system 130 may communicate with the virtual assistant renderer 118 of the VR/AR/MR processor 102, providing assistant control data to cause a virtual assistant to be output by the image output portion 110 of the VR/AR/MR rendering device 104. As discussed in greater detail below, the virtual assistant may be displayed to a user of the VR/AR/MR rendering device 104 to assist the user while the example system 100 shown in FIG. 1 performs certain operations, such as the reconstruction of the scene of the incident and reenactment of the incident using 3D representations of vehicles and non-vehicular objects of the incident.

As used herein, a 3D representation of an object is a visual image (or part of such an image) presented by a VR/AR/MR rendering device (such as VR/AR/MR rendering device 104) to a user in a manner so that the object appears to be three dimensional.

Figure 2:
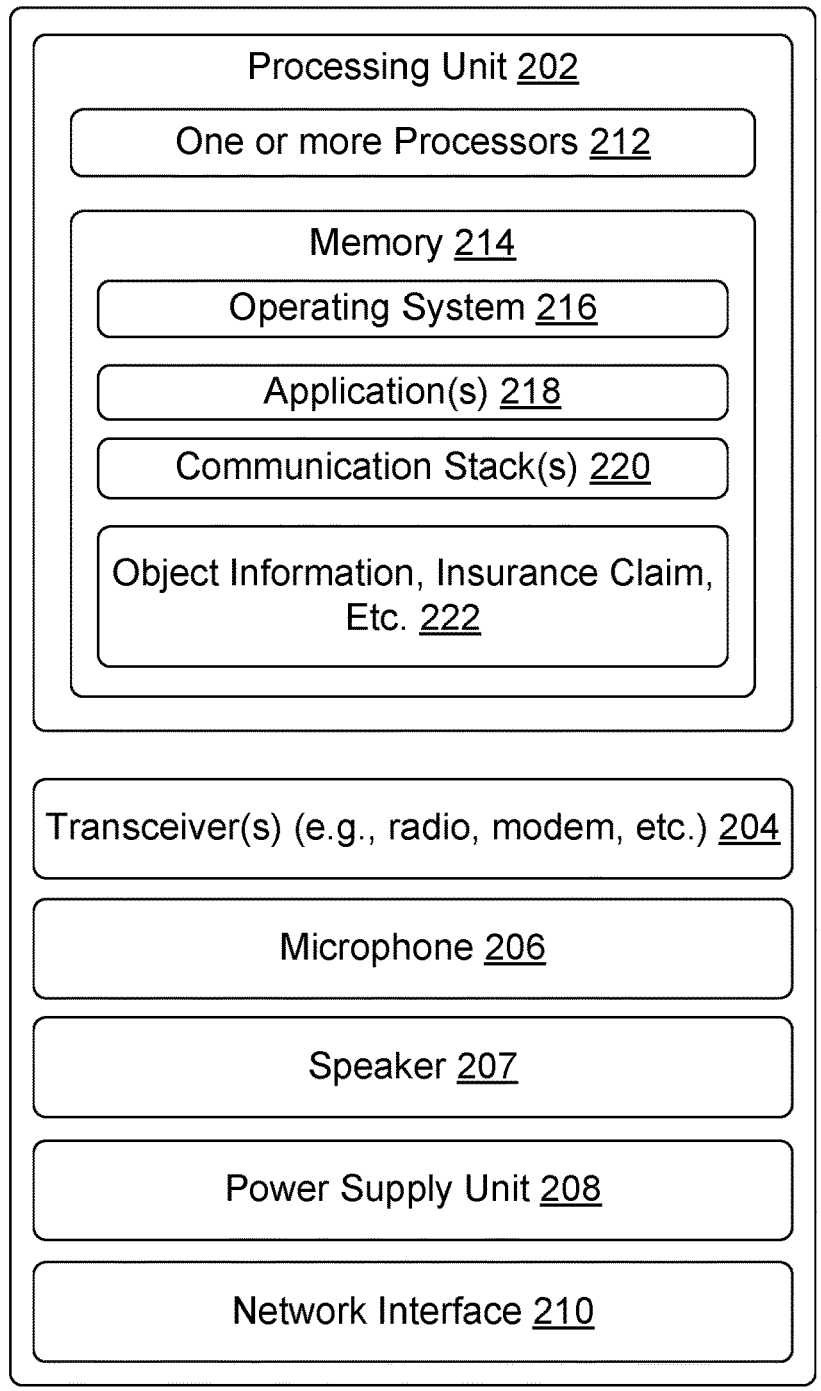
FIG. 2 schematically illustrates components of an example computing device that may be utilized in the example system shown in FIG. 1.

FIG. 2 schematically illustrates components of an example computing device 200. Such components may comprise one or more processors such as the VR/AR/MR processor 102 and/or one or more processors embedded into the VR/AR/MR rendering device 104. The example computing device 200 may comprise any type of device, such as a mobile phone or other mobile computing device (e.g., a tablet computing device), a personal computer such as a desktop computer or laptop computer, a portable navigation device, gaming device, portable media player, television, set-top box, automated teller machine, and so forth. In some examples, the computing device 200 is a computing device that also performs functions other than functionality used in processing VR/AR/MR data. For example, the computing device 200 may be part of a centralized computing system of a home or other premise, or the computing device may be part of an enterprise server system of an insurance company. In some examples, the computing device 200 is a specialized device configured specifically for processing VR/AR/MR data and, in other examples, the computing device 200 may perform other functions as well.

As shown in FIG. 2, an example computing device 200 may include at least one of a processing unit 202, a transceiver 204 (e.g., radio, modem, etc.), a microphone 206, a speaker 207, power supply unit 208, and a network interface 210. The processing unit 202 may include one or more processors 212 and memory 214. The one or more processors 212 may comprise microprocessors, central processing units, graphics processing units, or other processors usable to execute program instructions to implement the functionality described herein. Additionally, or alternatively, in some examples, some or all of the functions described may be performed in hardware, such as an application-specific integrated circuit (ASIC), a gate array, or other hardware-based logic device.

The transceiver 204 may comprise one or more hardware and/or software implemented radios to provide two-way RF communication with other devices in a network. The transceiver 204 may additionally or alternatively include a modem or other interface device to provide wired communication from the computing device 200 to other devices.

The microphone 206 may comprise physical hardware though, in some cases, an audio input interface may instead be provided to interface to an external microphone or other sound receiving device. Similarly, the speaker 207 may comprise physical hardware though, in some cases, an audio output interface may instead be provided to interface to an external speaker or other sound emitting device. The power supply unit 208 may provide power to the computing device 200. In some instances, the power supply unit 208 comprises a power connector that couples to an Alternating Current (AC) or Direct Current (DC) mains power line. In other instances, such as when the computing device 200 is a mobile phone or other portable device, the power supply unit 208 may comprise a battery.

The memory 214 may include an operating system (OS) 216 and one or more applications 218 that are executable by the one or more processors 212. The OS 216 may provide functionality to present a display portion of a visual/tactile user interface on a display of the computing device 200. The memory 214 may also include one or more communication stacks 220 configured to receive, interpret, and/or otherwise communicate with other devices. For example, the communication stacks may implement one or more of a cellular communication protocol, a Wi-Fi communication protocol, or other wireless or wired communication protocols. The communication stack(s) 220 describes the functionality and rules governing how the computing device 200 interacts with each of the specified types of networks.

The memory 214 may also store other information. For example, the memory 214 may store vehicle information, object information, reenactment information, insurance claim information, etc. 222. The object information may include, for example, image data of things or features that may be proximate a vehicular incident. The vehicle information may include, for example, image data of vehicles that may be part of an incident. The reenactment information may include, for example, change and movement data of the non-vehicular objects and vehicles that may be proximate a vehicular incident or directly involved in the incident.

The various memories described herein (e.g., the memory 214) are examples of computer-readable media. Computer-readable media may take the form of volatile memory, such as random-access memory (RAM) and/or non-volatile memory, such as read-only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase-change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain computing devices (e.g., the example computing device 200) are described herein, it should be understood that those computing devices may include other components and/or be arranged differently. As noted above, in some instances, a computing device may include one or more processors and memory storing processor-executable instructions to implement the functionalities they are described as performing. Certain computing devices may additionally or alternatively include one or more hardware components (e.g., application-specific integrated circuits, field-programmable gate arrays, systems on a chip, and the like) to implement some or all of the functionalities they are described as performing.

FIGS. 3-17B depict example snapshots of a scenario of what might occur after an incident. In this scenario, a user 302 was the driver of a car 306 that was just involved in an automobile accident at an intersection. More particularly, a truck rear-ended the insured car 306 in the intersection. For this scenario, the car 306 is insured and the user 302 is the policyholder and/or a covered driver of the car.

A policyholder is a label for the person who owns or holds the insurance policy that covers at least one vehicle involved in a subject vehicular incident. This term is used loosely herein and generally refers to any covered driver under the policy. Unless the context indicates otherwise, the policyholder and the user are the same.

The snapshots depicted in FIGS. 3-17B illustrate examples of what might occur in this example post-incident scenario in accordance with one or more implementations of the technology described herein. Of course, the details of a different scenario will result in differing examples of what occurred, but they would still be in accordance with one or more implementations of the technology described herein.

For FIGS. 3-17B, the depicted snapshots include the items that the user 302 might see through a head-mounted VR/AR/MR rendering device 304, and such items are shown with solid lines. In contrast, the user 302 and VR/AR/MR rendering device 304 are illustrated with dashed lines, indicating that the user 302 and VR/AR/MR rendering device 304 are not within the view of the user 302 using the VR/AR/MR rendering device 304. Instead, the depiction of the user 302 and VR/AR/MR rendering device 304 is provided to show the perspective of the view of the environment 300. This dashed line depiction for a user and rendering device is used in FIGS. 3-17B.

Figure 3:
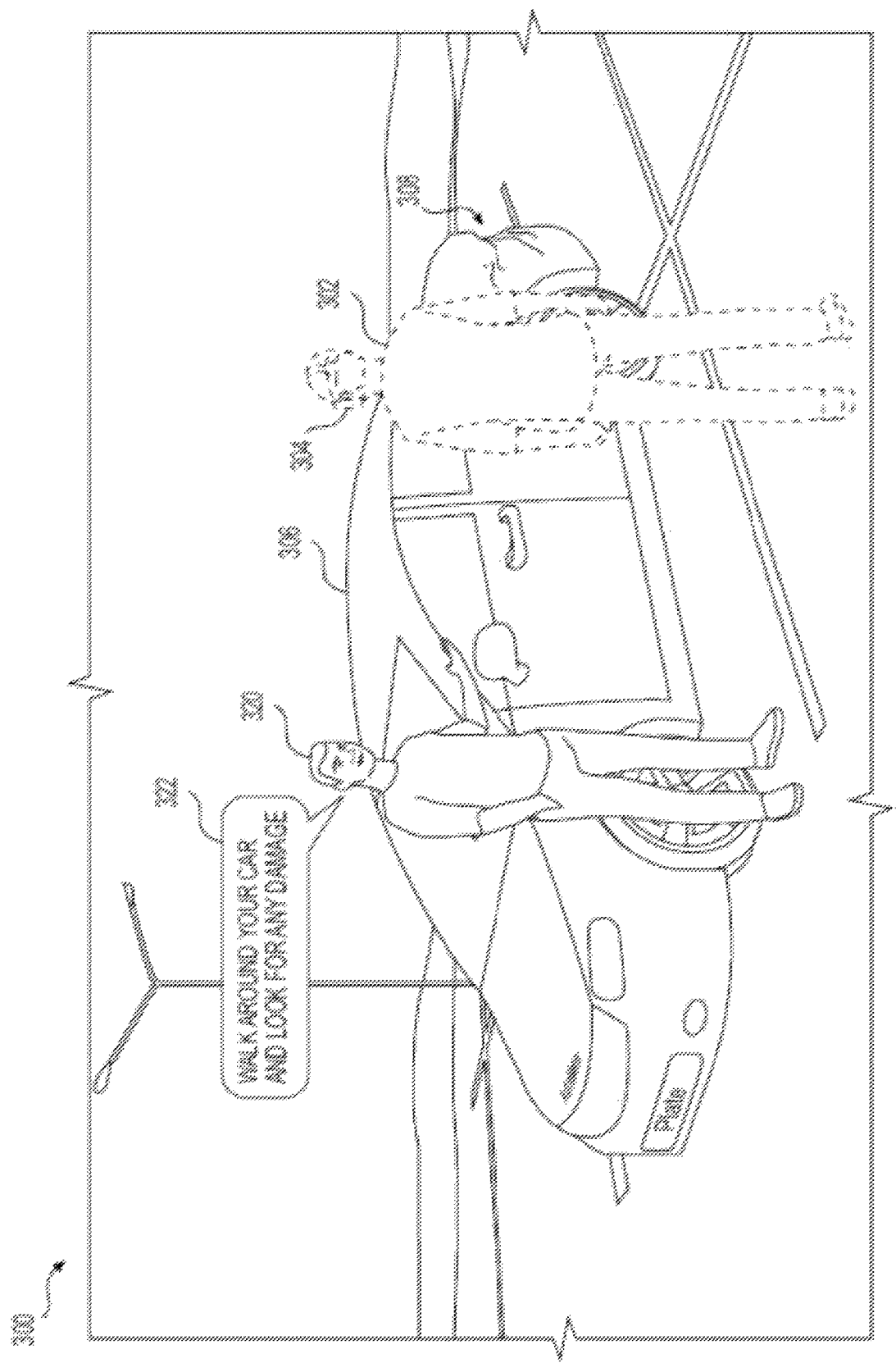
FIG. 3 illustrates a view of an environment as displayed to a user wearing a head-mounted VR/AR/MR rendering device.

FIG. 3 illustrates an example view of an actual environment 300 as displayed to the user 302 wearing the VR/AR/MR rendering device 304. The environment 300 includes the car 306 parked in a parking lot nearby a scene of an automobile accident in an intersection. Indeed, the car damage 308 to the rear of the car is partially seen in the example view of the environment 300. The view of the environment 300 includes a virtual assistant 320 is assisting the user 302 to gather post-incident information.

The VR/AR/MR rendering device 304 may be configured, for example, like the VR/AR/MR rendering device 104. The image seen by the user 302 may be generated by the VR/AR/MR processor 102 and displayed on an image output portion of the VR/AR/MR rendering device 304. The head-mounted VR/AR/MR rendering device 304 displays to the user 302 the actual environment 300, such as a parking lot, and/or just a representation of the actual environment shown in the view of the environment 300.

The VR/AR/MR rendering device 304 may display the actual environment 300 (and/or a representation of the actual environment, such as a virtual representation) to the user 302 in a virtual-reality, mixed-reality, and/or augmented-reality fashion. That is, in one example, the user 302 may be in the actual environment 300 wearing the head-mounted VR/AR/MR rendering device 304, and the view the VR/AR/MR rendering device 304 may display to the user 302 is an image of the actual environment 300.

That is, in the view of the environment 300, the VR/AR/MR rendering device 304 displays the virtual assistant 320 to the user 302. Still, the virtual assistant is not present in the actual environment. For example, referring back to FIG. 1, the virtual assistant control system 130 may communicate via the network 126 to the VR/AR/MR processor 102. The virtual assistant control system 130 may operate automatically, responsive to human input, or some combination. For example, the virtual assistant control system 130 may communicate with the virtual assistant renderer 118 of the VR/AR/MR processor 102 to cause the VR/AR/MR rendering device 304 to display the virtual assistant 320 on an image output portion of the VR/AR/MR rendering device 304.

The VR/AR/MR processor 102 may cause the VR/AR/MR rendering device 304 to display the virtual assistant 320 as pointing to or otherwise non-verbally indicating the car 306. The VR/AR/MR processor 102 may cause the VR/AR/MR rendering device 304 to display the car 306 in a highlighted manner or otherwise emphasized. This may assist the user 302 to know that the virtual assistant 320 is pointing to or otherwise non-verbally indicating the car 306.

In addition to the virtual assistant 320 pointing to or otherwise non-verbally indicating the car 306, the VR/AR/MR rendering device 304 may cause the virtual assistant 320 to verbally or non-verbally request the user 302 to act within in the actual environment, such as around the car 306. In the view of the environment 300, the VR/AR/MR rendering device 304 is causing the virtual assistant 320 to make an utterance 322, requesting the user 302 to walk around the car 306 and look for any damage.

The user 302 may perform the requested action in the actual environment so, for example, an image the input portion of the VR/AR/MR rendering device 304 obtains includes imagery that would not otherwise be included, such as a complete view around the car 306.

Figure 4:
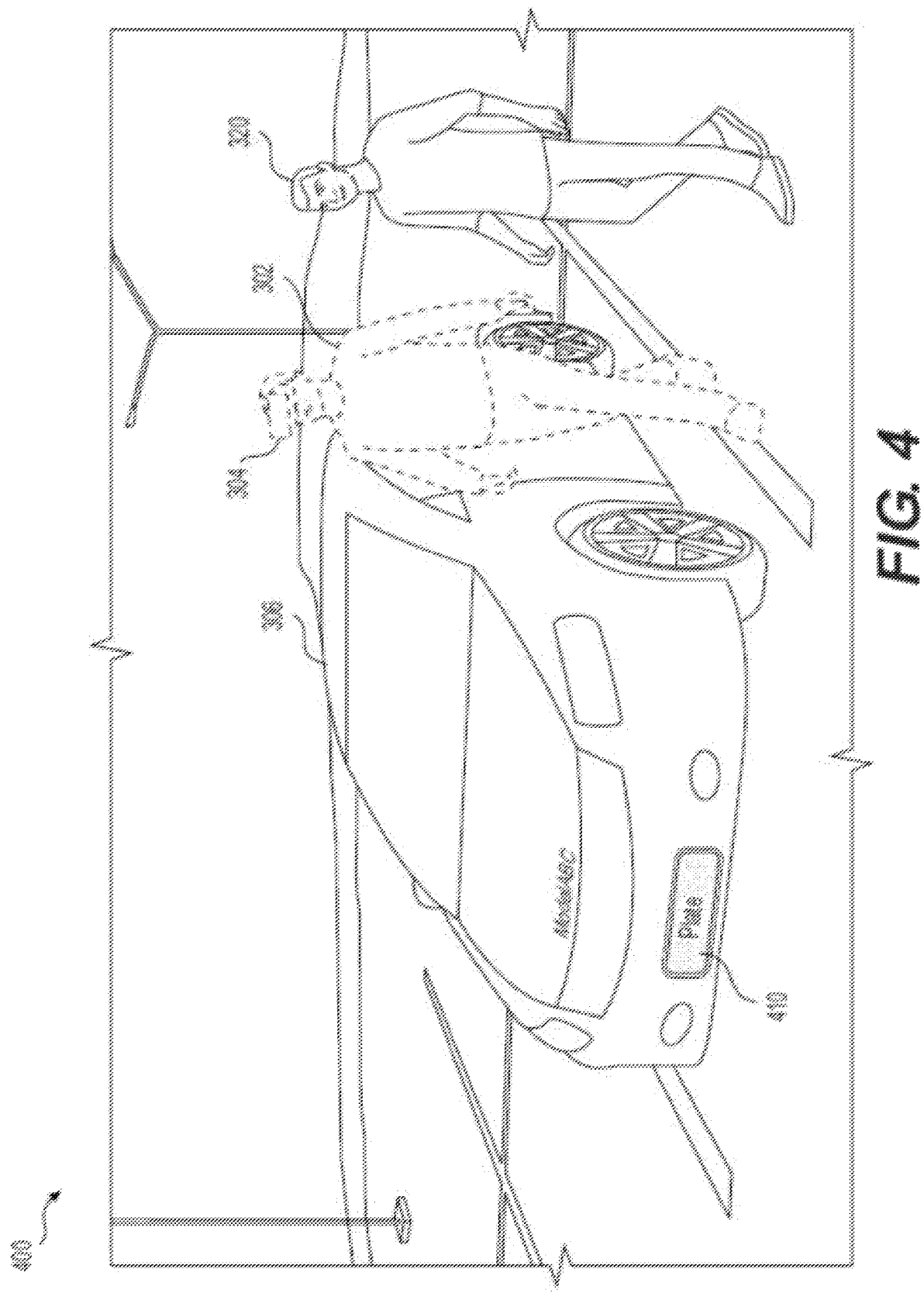
FIGS. 4-5 illustrate examples of another view of the actual environment shown in FIG. 3 that the VR/AR/MR rendering device displays to the user wearing the head-mounted VR/AR/MR rendering device.

FIG. 4 illustrates a view 400 of the same environment 300, but from a different angle as may be seen by the user 302, who is wearing the head-mounted VR/AR/MR rendering device 304. As suggested by the virtual assistant 320 by the utterance 322, the user 302 is walking around the car 306 to inspect it for damage.

As the user moves in the actual environment, the virtual assistant 320 is depicted to the user 302 via the VR/AR/MR rendering device 304 as moving along with the user. That is, the user 302 can see the 3D representation of the virtual assistant 320 accompany the user as the user walks around the car 306.

As the user 302 walks around the car 306 and views the car, the image input portion 114 of the VR/AR/MR rendering device 304 captures video images of the car 306 from various angles. In doing so, one or more images of a license plate 410 of the car 306 are captured. The VR/AR/MR rendering device 304 may spatially capture the actual environment to generate a data set that is representative of the actual environment. For example, the VR/AR/MR rendering device 304 may include an imaging device such as a three-dimensional scanner, and the VR/AR/MR rendering device 304 may generate a point cloud or other three-dimensional representation that is representative of an actual environment.

The VR/AR/MR processor 102 or an analogous device may receive the one or more images of the license plate 410 from the VR/AR/MR rendering device 304 and process the received image to recognize the feature as being a license plate using image recognition software, artificial intelligence software, and/or other types of software and/or hardware.

For example, a three-dimensional representation of feature, like the license plate 410, in the format of a three-dimensional point cloud may be processed geometrically to determine that the combination and configuration of flat planes versus curved surfaces, size/scale, and color values are likely to compose a certain class of non-vehicular object (e.g., a flat rectangle with a defined aspect ratio on the front or back of a car is likely to be a license plate) and further a certain make and/or model of that class of non-vehicular object (e.g., comparing the license plate against a database of geometry for known types of license plates resulting in identifying the state of the license plate). In some examples, the VR/AR/MR processor 102 may communicate with external databases via a network, such as communicating with the external data sources 128 via the network 126, to obtain metadata or other information about recognized features. Furthermore, characteristics like material (metal versus wood) may be identified to provide additional metadata about the features, such as identifying that the particular number of the license plate is associated with this type of car for the known policy. The VR/AR/MR processor 102 may provide an indication of the metadata or other information about the recognized features to the VR/AR/MR rendering device 304.

In the example shown in FIG. 4, the VR/AR/MR processor 102 recognizes the car 306 as a car also recognizes the license plate 410. Furthermore, the VR/AR/MR processor 102 or analogous device may obtain metadata or other information about the car 306 or license plate 410 from local information stored within the VR/AR/MR processor 102 or analogous device or from the external data sources 128 (e.g., state motor vehicle registry). The VR/AR/MR processor 102 indicates feature identifications, the metadata and/or other information to the VR/AR/MR rendering device 304. The VR/AR/MR rendering device 304 may display the feature identifications, metadata and/or other information to the user 302 in association with the actual environment and/or a representation of the actual environment.

Figure 5:
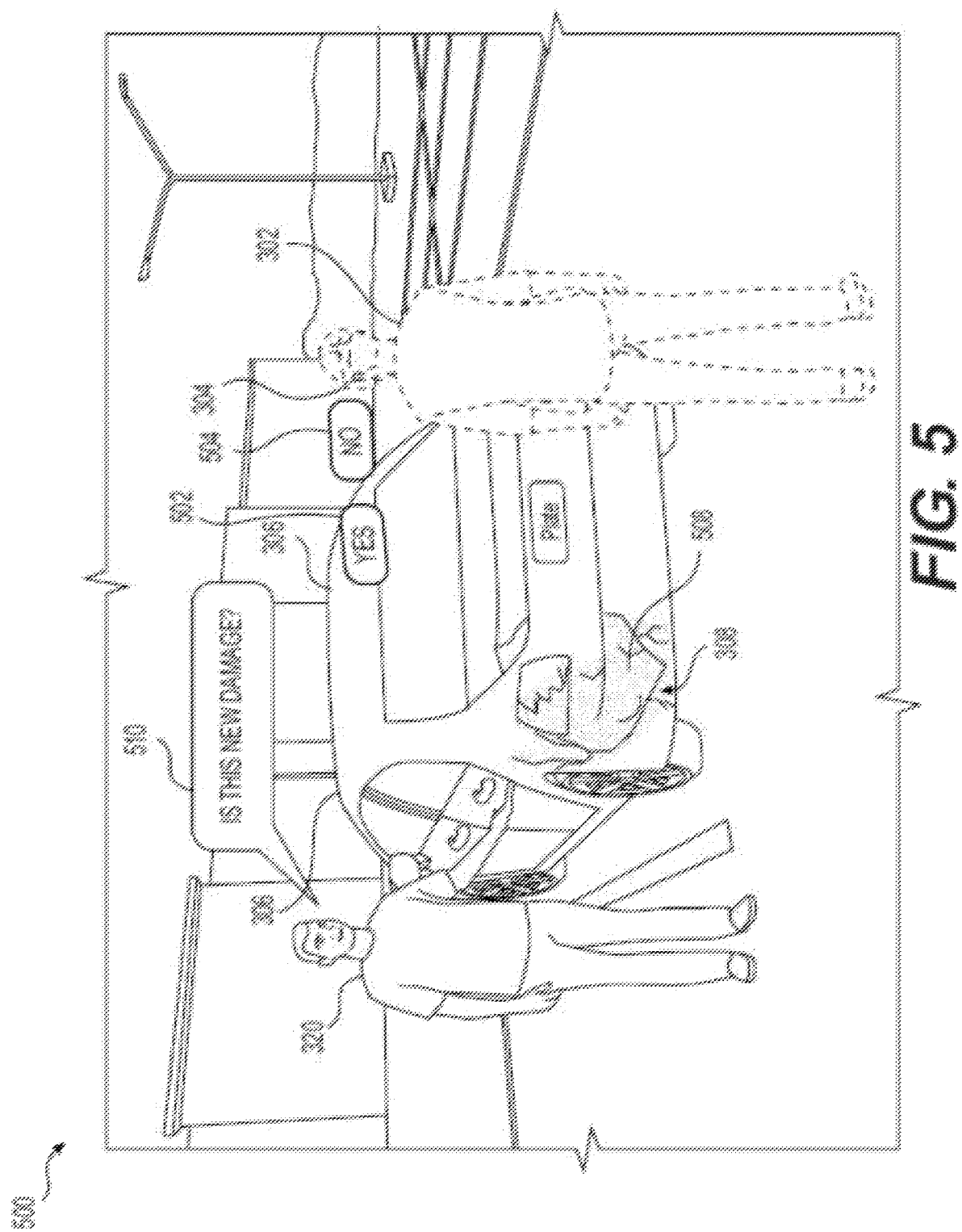

FIG. 5 illustrates a view 500 of the same environment 300 shown in view 400, but from a different angle as may be seen by the user 302 who is wearing the head-mounted VR/AR/MR rendering device 304. In his walk around the car 306, the user 302 arrives at the back of the car and can better see the damage 308.

An internal database 124 may store, for example, a point cloud representation of the make and model of an undamaged version of the car 306, which is covered by the insurance policy of the user. In addition, other metadata about the car 306 may also have been collected and/or otherwise determined and stored in the internal database 124.

A shaded projection 508 is shown to the user 302 via the VR/AR/MR rendering device 304. The shaded projection 508 represents the difference or delta between the damage 308 to that area of the car 306 and the undamaged version of the car (as derived from its internal database 124).

In response to a recognition of possible damage to the car 306 at the damage 308, the VR/AR/MR rendering device 304 triggers the shaded projection 508 of the damage, the virtual assistant 320 to address the user 302 with utterance 510, and generates annotations 502 and 504. This interaction is intended to confirm that the detected damage was a result of this incident that just occurred and not some past or old damage.

The utterances described herein may also confirm the user's input. The VR/AR/MR rendering device 304 may indicate the utterances to the VR/AR/MR processor 102, for example. In some examples, the user may make a gesture or other indication in addition to or in place of the utterance, and the VR/AR/MR rendering device 304 may indicate the gesture or other indication to the VR/AR/MR processor 102, for example. The VR/AR/MR processor 102 may utilize one or more received indications to populate entries in a database, such as to populate and/or modify entries in the internal database 124.

The virtual assistant 320 indicates (e.g., by pointing towards) the shaded projection 508 of the detected damage and asks whether the indicated damage is new. The annotations 502 and 504 are options that are projected in front of the user 302 wearing the head-mounted VR/AR/MR rendering device 304. The VR/AR/MR processor 102 may, for example, generate data for the annotations 502 and 504 and provide the data to the VR/AR/MR rendering device 304 for a display to the user 302. The VR/AR/MR rendering device 304 displays the annotations to assist the user in responding to the virtual assistant's query.

If this damage is indeed new, the user 302 may select the YES option of the annotation 502. Otherwise, the user 302 may select the NO option of the annotation 504. The user can make the selection hands-free by speaking the desired option, and voice-recognition techniques will interpret accordingly. The user 302 can gaze at their choice or "touch" their choice. Those experienced with VR/AR/MR are familiar with these selection options available in such technology.

Figure 6:
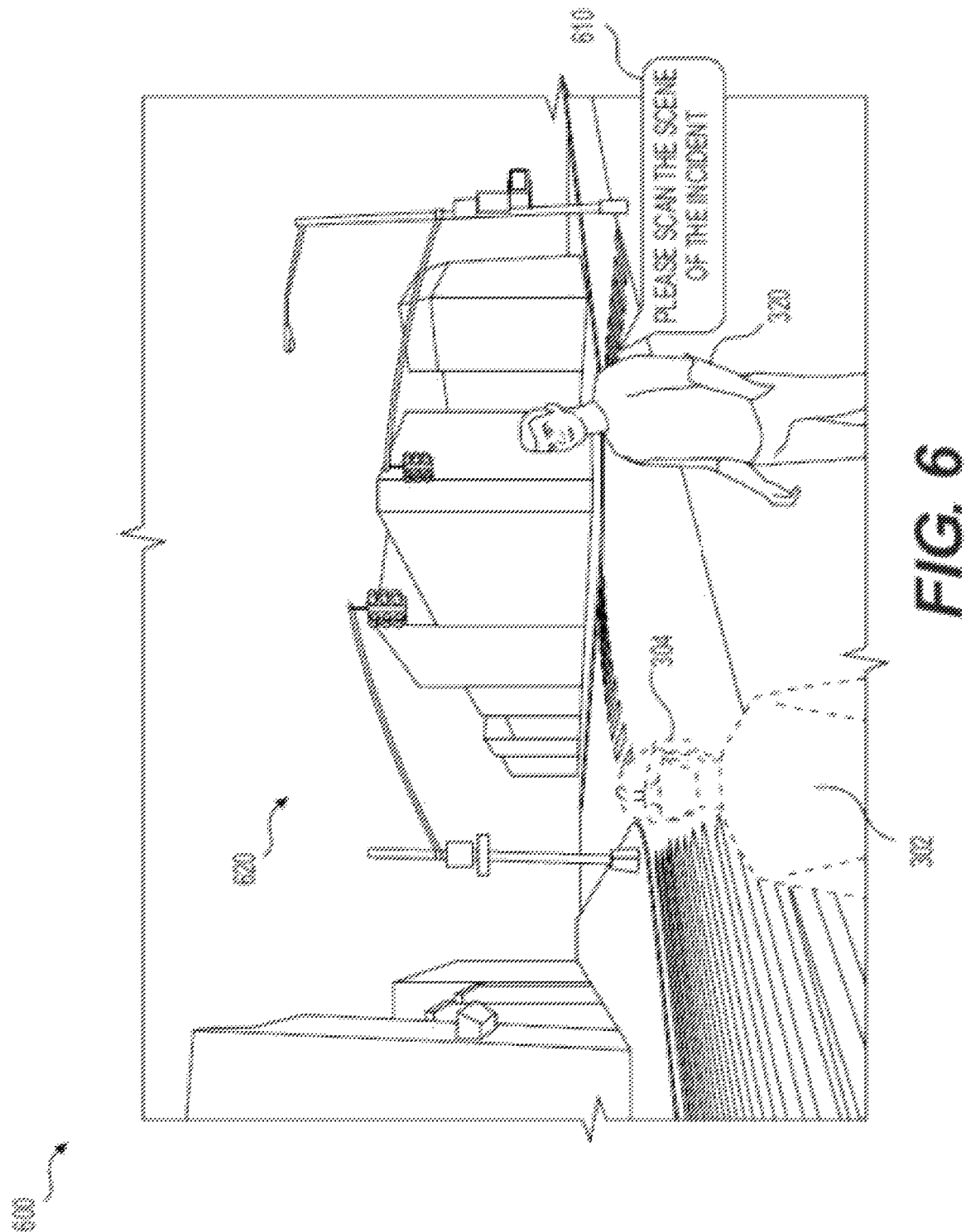
FIG. 6 illustrates an example view of another environment that is proximate of a vehicular incident as displayed to a user wearing a head-mounted VR/AR/MR rendering device.

FIG. 6 illustrates a view 600 of a different environment than shown in views 400, and 500. Indeed, this is a view of an actual scene 620 of the incident. For this example, this scene is an intersection between two roads. Thus, the user 302 is viewing view 500 of the actual scene of the incident via the VR/AR/MR rendering device 304.

As used herein, the scene of the vehicular incident includes the vehicles and non-vehicular objects that are proximate the incident. The bounds of the scene is largely based on the choices that the user makes in reconstructing the scene.

The VR/AR/MR rendering device 304 projects the virtual assistant 320 into the view 600 of the actual scene 620 of the incident, which is presumably an intersection nearby the parking lot of environment 300 in this example. The virtual assistant 320 may indicate (e.g., by pointing towards) scene 620 and ask for the user 302 to capture the scene of the incident via utterance 610.

In response, the user 302 may look all around scene 620 to record the scene from various angles. The VR/AR/MR rendering device 304 records the images of the capture of scene 620. This incident-scene capture is stored in the internal database 124 and is associated with the report or record of the incident. The user 302 may be asked to recount the incident while capturing scene 620 of that incident. If so, the audio of that incident is captured by the VR/AR/MR rendering device 304.

In addition to the images and audio, the VR/AR/MR rendering device 304 may acquire location information (e.g., a global positioning system) to identify the location of the incident. This location information may be stored in the internal database 124 and be used to acquire roadmap or satellite map data of the location. In addition, this location information may be used later to reconstruct the scene 620 via 3D representations.

Figure 7:
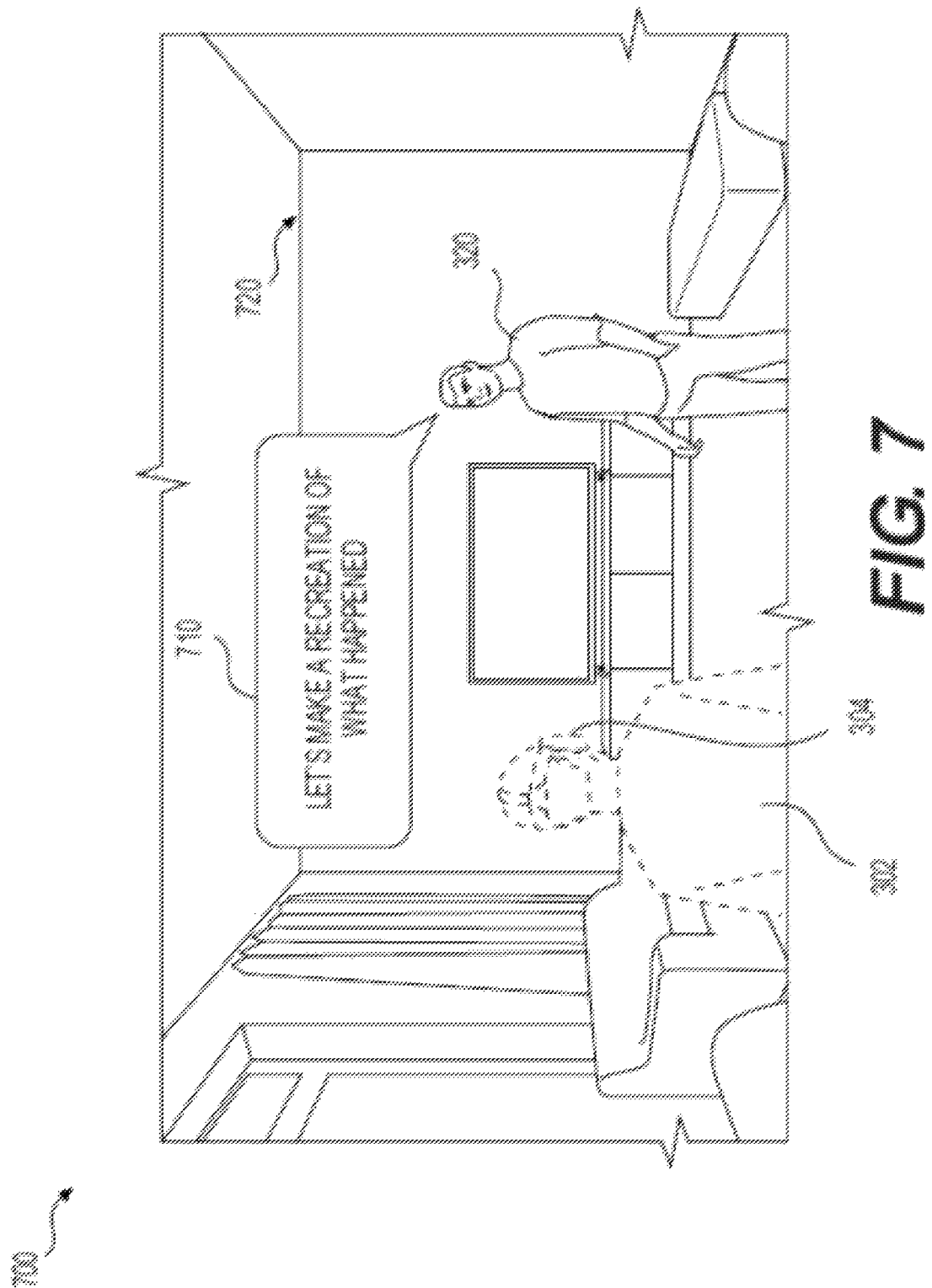
FIGS. 7-8 illustrates examples of a view of still another environment (e.g., room of a house) as displayed to a user wearing a head-mounted VR/AR/MR rendering device.

FIG. 7 illustrates a view 700 of a different environment than shown in the previous views. Presumably, this is the view 700 within a room 720 of the home of the user 302. Room 720 is the setting for FIGS. 7-17B, which will illustrate the user 302 using the technology described herein to facilitate vehicular incident reenactment using 3D representations. However, the incident reenactment may occur at a location convenient to the user 302. Indeed, it may occur immediately after the incident once the user is in a safe location (as depicted in FIGS. 3-6).

The VR/AR/MR rendering device 304 projects the virtual assistant 320 into view 700 of room 720. The virtual assistant 320 may suggest that the user make a recreation of the incident via utterance 710.

Figure 8:
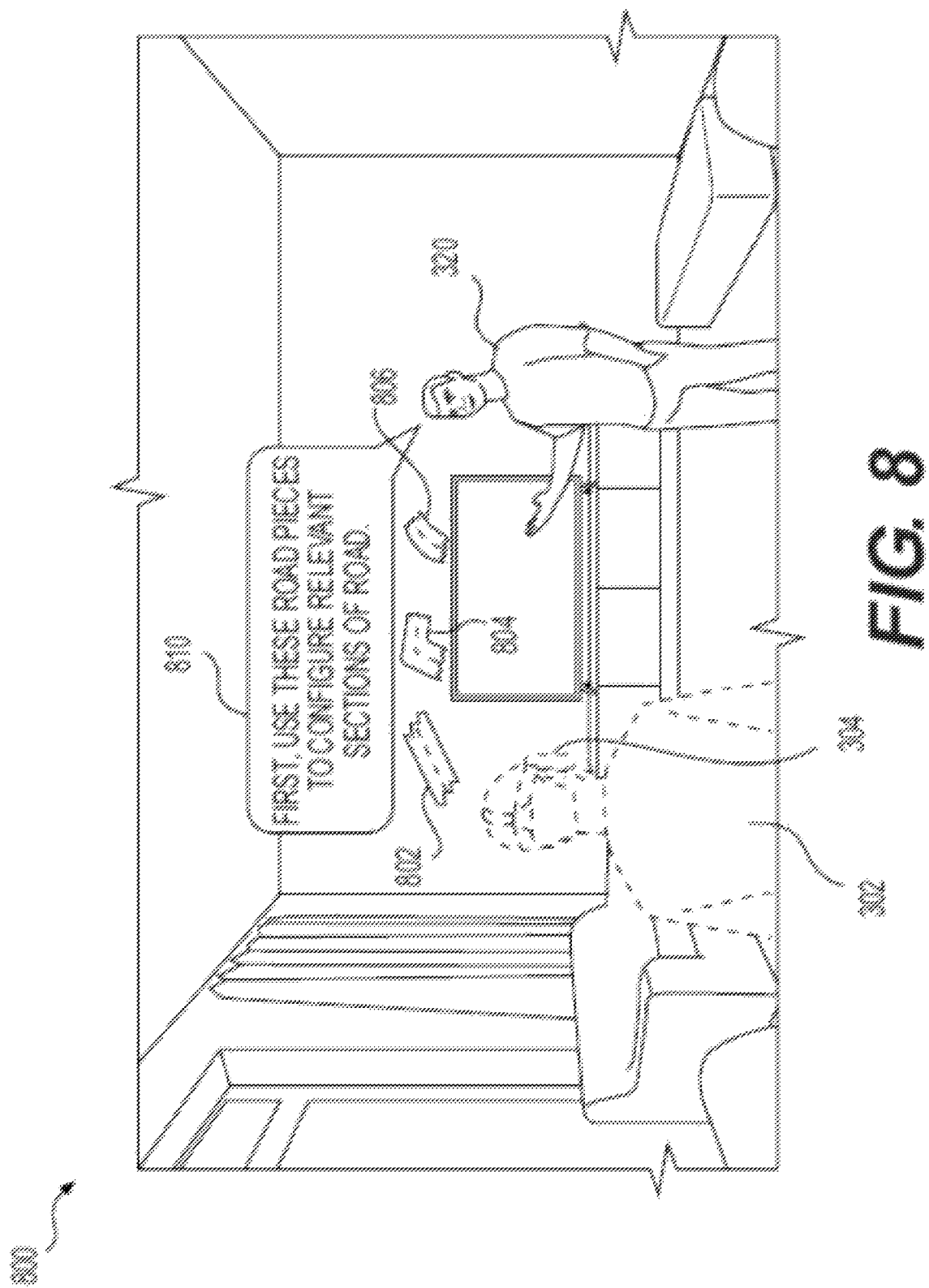

FIG. 8 illustrates a view 800 of the same environment shown in view 700 as may be seen by the user 302, who is wearing the VR/AR/MR rendering device 304. The VR/AR/MR rendering device 304 projects the virtual assistant 320 and annotations 802, 804, and 806 into this view 800.

As depicted, the virtual assistant 320 indicates the annotations and asks the user 302, via utterance 810, to select a road piece to configure the relevant sections of the road to start the reconstruction of the incident.

Annotations 802, 804, and 806 appear as floating 3D representations of pieces of roads in front of the user 302. Annotation 802 is a straight section of the road. Annotation 804 is a ninety-degree turn road section. Annotation 806 is a curved road section. Of course, these particular options are provided for illustration purposes. Other implementations may offer more or fewer options and/or utterly different road section options.

Figure 9:
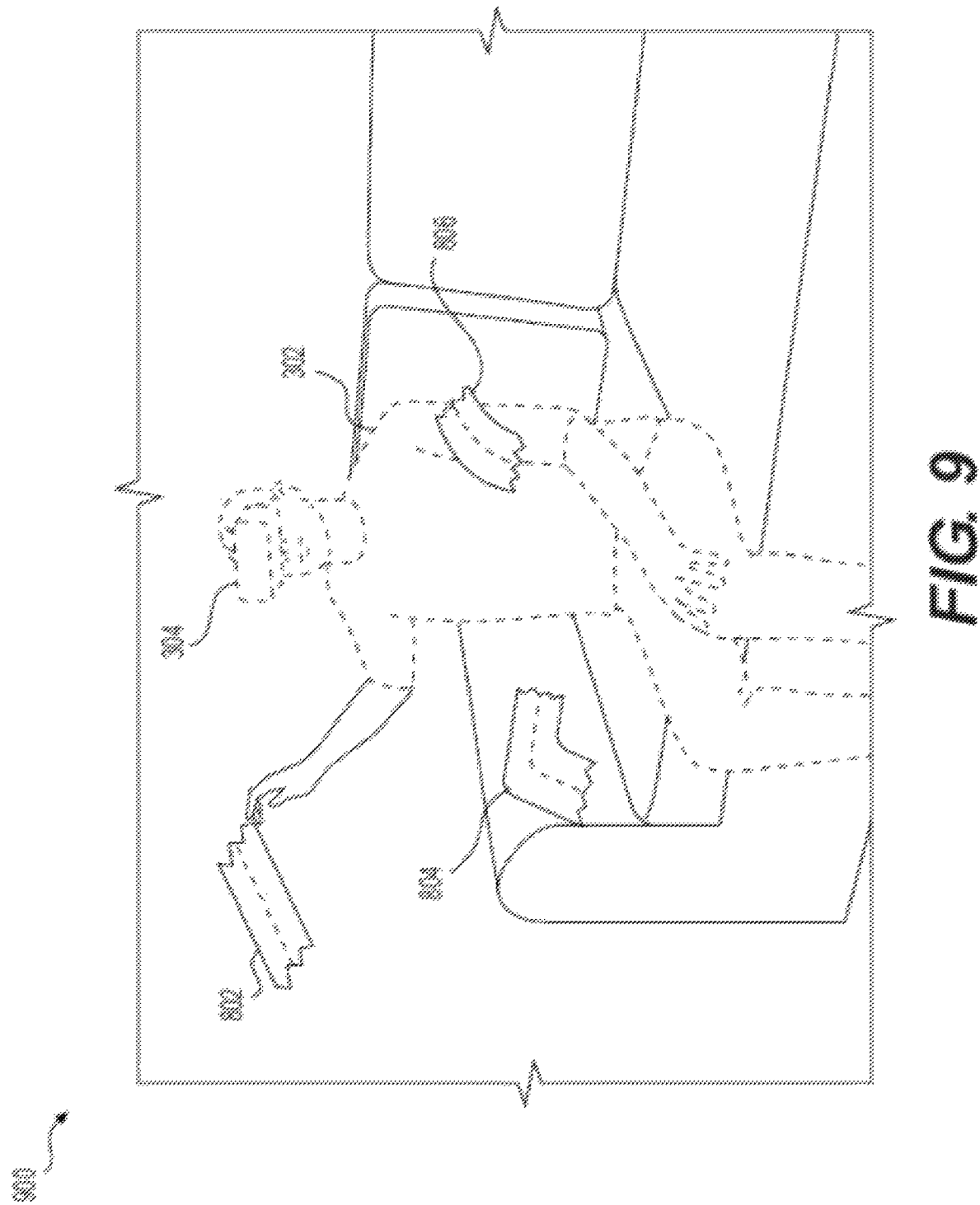
FIGS. 9-10C illustrate example views in the same environment shown in FIGS. 7-8 that the VR/AR/MR rendering device displays to the user wearing the head-mounted VR/AR/MR rendering device.

FIG. 9 illustrates a view 900 of the same environment shown in views 700 and 800, but from a different viewing angle, as may be seen by the user 302 who is wearing the VR/AR/MR rendering device 304. The user 302 is sitting on a sofa in the same room as views 700 and 800. The VR/AR/MR rendering device 304 projects the annotations 802, 804, and 806 in front of the user 302.

The user 302 may select annotation 802 to start the reconstruction of the incident using that road piece. As depicted, the user may "touch" or "grab" annotation 802. Since the annotation 802 does not exist in reality, the touching or grabbing is virtual and based on known VR/AR/MR techniques of tracking the location of the user's hand and the annotation in 3D rendered space. In other instances, the user may use voice commands to select the appropriate annotation.

Figure 10A:
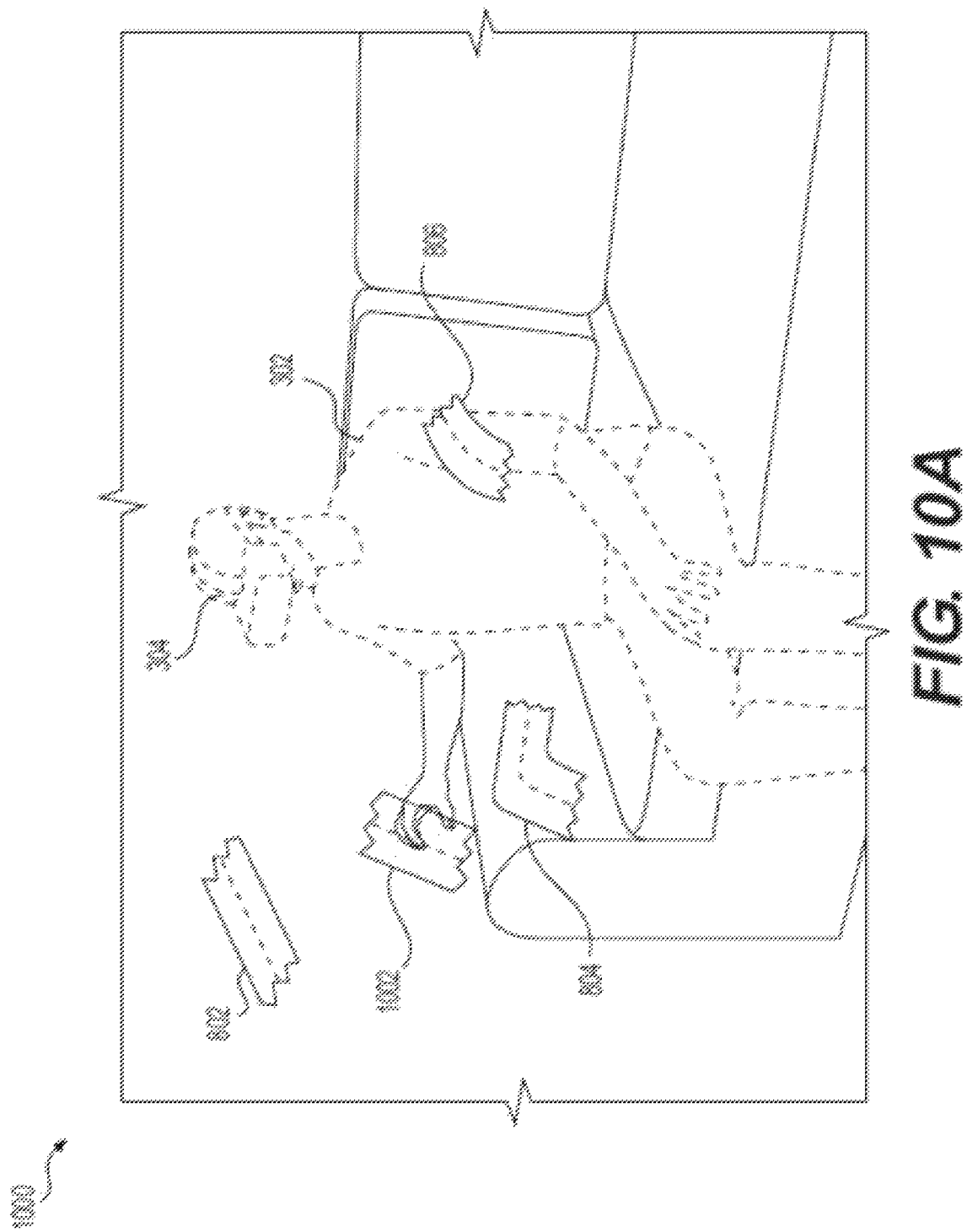

FIG. 10A illustrates a view 1000 of the same environment shown in view 900, as may be seen by the user 302. In this view 1000, the VR/AR/MR rendering device 304 projects the annotations 802, 804, and 806 in front of the user 302 and a selected road piece 1002.

While sitting on the sofa, the user 302 is virtually holding the selected road piece 1002 and moving that piece into a forthcoming recreation of the scene of the incident. As soon as the user 302 selected and moved the road piece 1002 away from its origin point at annotation 802, the VR/AR/MR rendering device 304 replaced the annotation 802 in the view 1000 of the user so that the user can select another road piece like that again.

FIG. 10B illustrates a view 1020 of the same environment shown in view 1000, as may be seen by the user 302. This view 1020 illustrates actions that may take place after the events shown in view 1000. In particular, this view 1020 shows the early stage of an image of the 3D incident reenactment 1630 of the scene of the incident.

The 3D incident reenactment 1630 of the scene of the incident is a projection of 3D representations of the static objects that remain unchanged and unmoved relative to each other over a duration (e.g., timespan) of the 3D reenactment of the vehicular incident. Typically, the non-vehicular objects are often static objects. In some instances, non-vehicular objects may change or move relative to others during an incident reenactment. For example, a traffic light may change or a telephone pole may fall when a vehicle collides with it.

The scene being recreated may be the actual scene 620 of the incident. While not shown, in some implementations, information about scene 620 may be projected for the user's reference while reconstructed. Indeed, in some instances, a 3D representation or 2D map of the location may be projected to the user 302 to aid the user with the reconstruction. The user 302 may use this projection as a virtual base, foundation, or scaffolding upon which he may base the reconstruction. The 3D representation or 2D map may be derived from the on-scene capture by the user, roadmaps, and/or satellite or aerial images of the location of scene 620 of the incident.

The scene-reconstruction 1010 assembled thus far includes 3D representations of road pieces 1004 and 1006 connected and intersecting at approximately ninety degrees. In view 1020, the VR/AR/MR rendering device 304 projects the user manipulating the selected road piece 1002 towards the scene-reconstruction 1010. The manipulation is a virtual movement of the selected road piece.

Figure 10C:
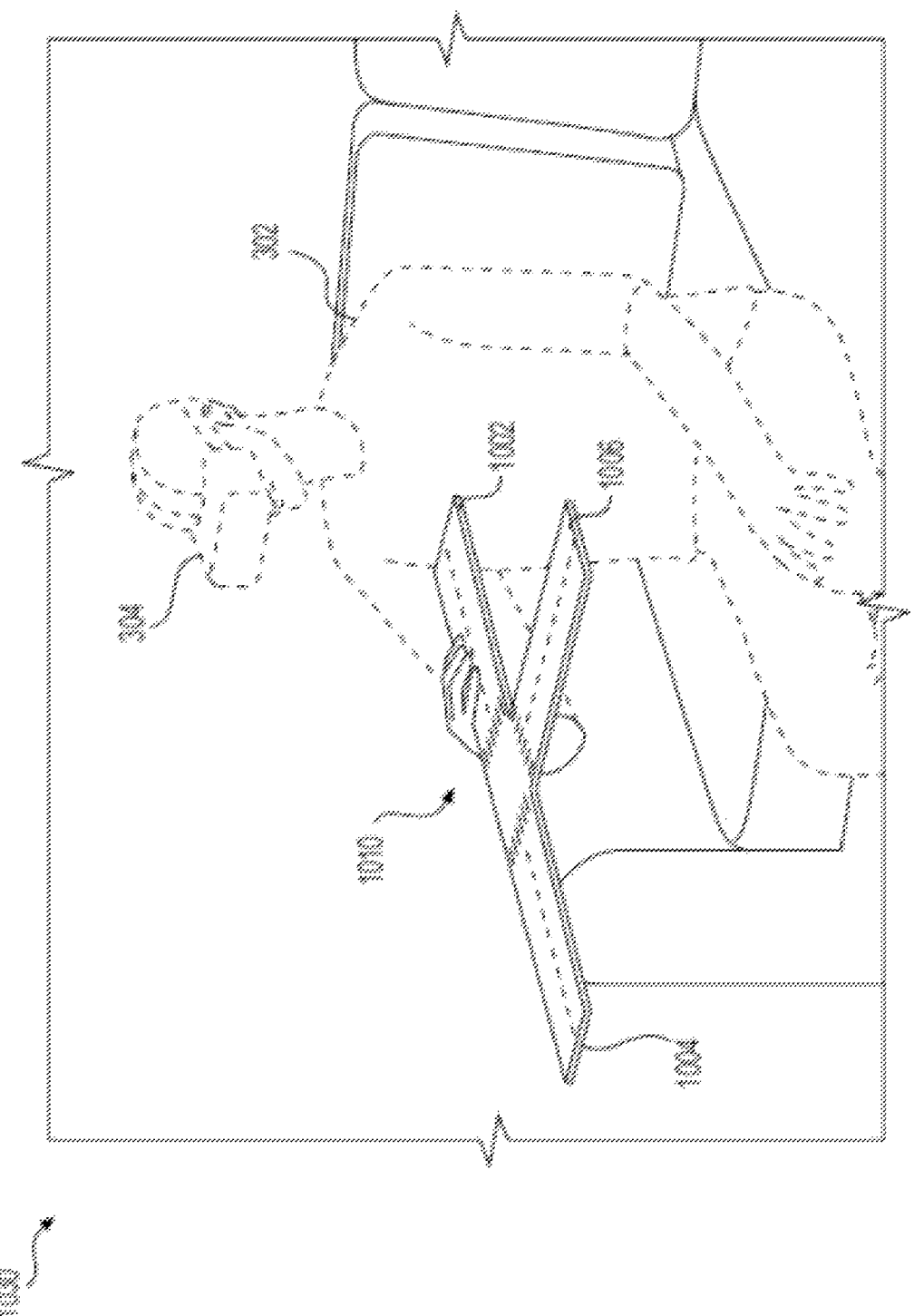

FIG. 10C illustrates a view 1030 of the same environment shown in views 1000 and 1020, as may be seen by the user 302. This view 1030 illustrates actions that may take place after the events shown in views 1000 and 1020. In particular, this view 1030 shows the next stage of the image of the 3D scene-reconstruction 1010 of the scene of the incident.

In particular, the view 1030 shows the user 302 virtually attaching the 3D representations of the selected road piece 1002 to the 3D scene-reconstruction 1010. In the view 1030, the VR/AR/MR rendering device 304 projects the user virtually attaching the selected road piece 1002 to the existing stitched together road pieces of the scene-reconstruction 1010.

In some instances, the VR/AR/MR rendering device 304 may predict where the user may or could manipulate (e.g., position or attach) the selected annotation to the existing scene-reconstruction 1010. If so, the /AR/MR rendering device 304 projects highlighted annotation at the predicted location for positioning or attachment. This highlighting indicates a suggestion to the user 302, where he might choose to place the selected annotation that is virtually in his hand.

Figure 11:
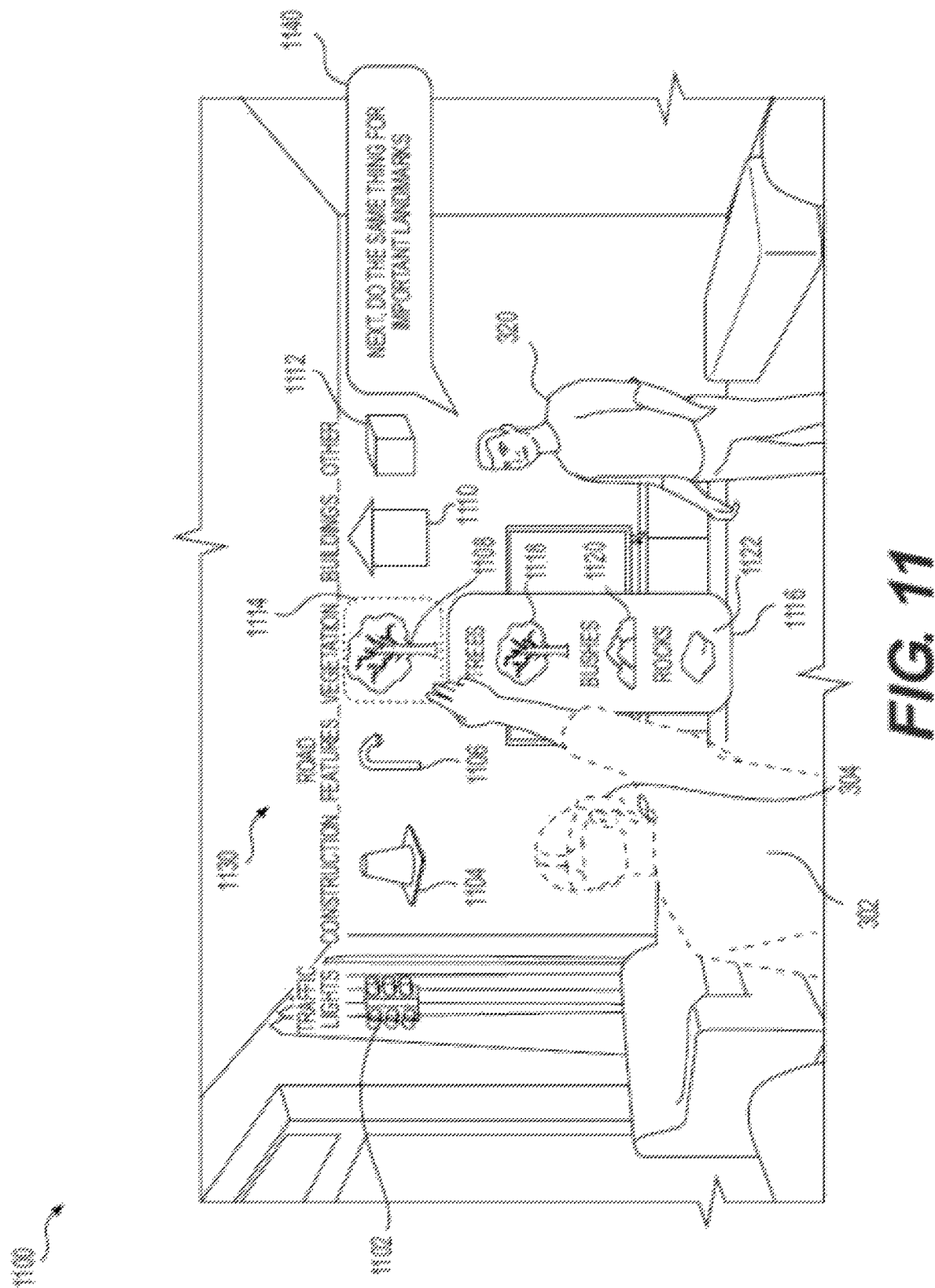
FIGS. 11-17B illustrates examples of views of the same environment shown in FIGS. 7-10C that the VR/AR/MR rendering device displays to the user wearing the head-mounted VR/AR/MR rendering device.

FIG. 11 illustrates a view 1100 of the same environment shown in views 700 and 800, as may be seen by the user 302 who is wearing the VR/AR/MR rendering device 304. The VR/AR/MR rendering device 304 projects the virtual assistant 320 and a menu 1130 of annotations into this view 1100.

As depicted, the virtual assistant 320 guides the user 302, via utterance 1140, to select a landmark or feature from the menu 1130 of such to continue the scene-reconstruction of the incident.

As depicted, the menu 1130 includes the several annotations that each appear as floating 3D representations of landmarks or other features in front of the user 302. Annotation 1102 represents an option for traffic lights. Annotation 1104 represents an option for construction equipment or signals. Annotation 1106 represents an option for road features, such as streetlight posts. Annotation 1108 represents an option for vegetation. Annotation 1110 represents an option for buildings, such as a corner drug store. Annotation 1112 represents an option for other categories or non-categorized landmarks and features. Of course, these particular options are provided for illustration purposes. Other implementations may offer more or fewer options and/or utterly different landmark options.

As depicted, the user 302 selects the annotation 1108, which may trigger a drop-down listing 1116 of sub-options. Highlight 1114 around annotation 1108 indicates that it has been selected for the drop-down listing 1116, which includes trees 1118, bushes 1120, and rocks 1122. The user 302 can select the appropriate sub-object from the drop-down list 1116.

Figure 12:
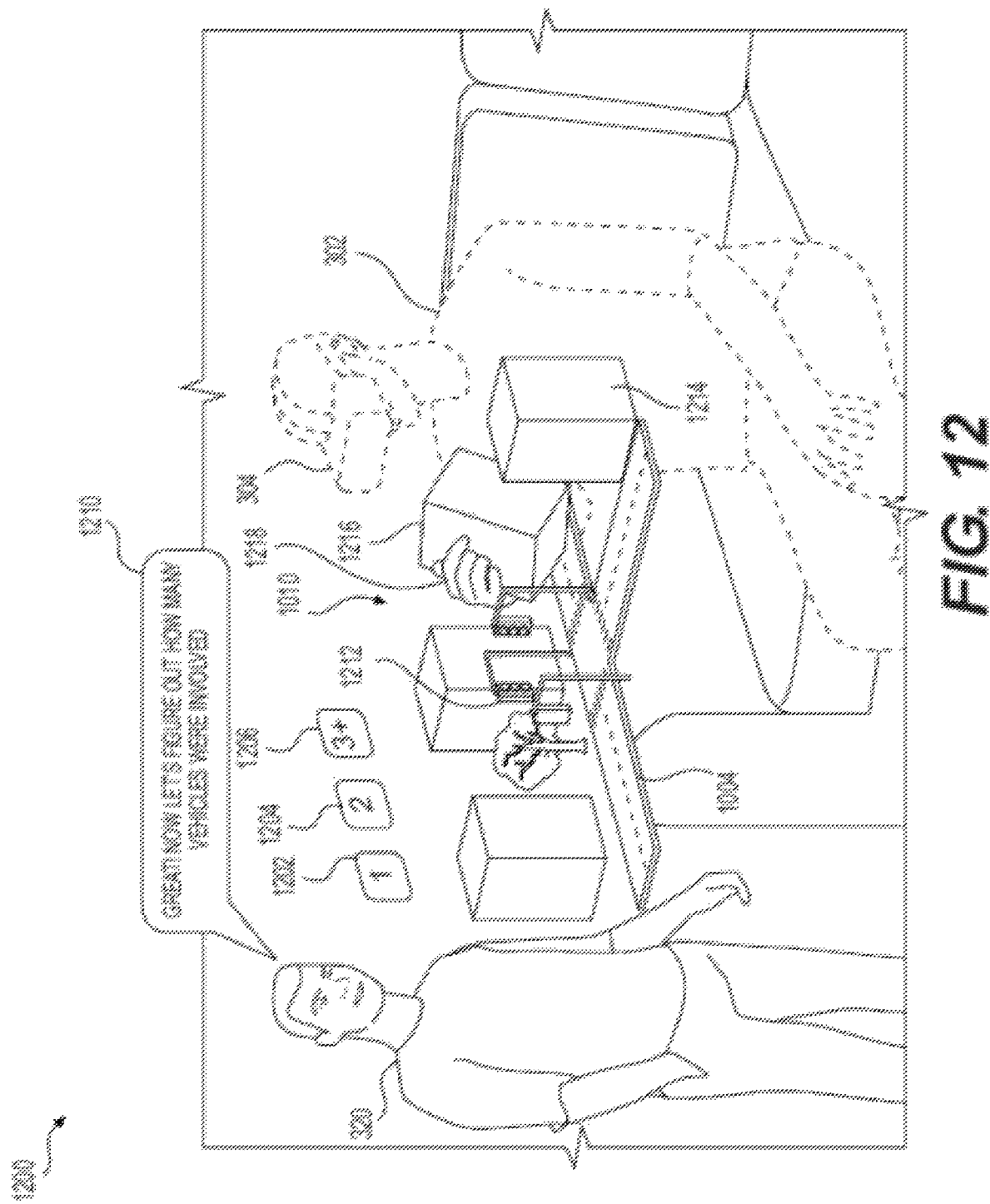

FIG. 12 illustrates a view 1200 of the same environment shown in views 900 and 1000, as may be seen by the user 302. In this view 1200, the VR/AR/MR rendering device 304 projects the present stage of the image of the 3D scene reconstruction 1010 of the scene of the incident.

At this stage, the user 302 has already manipulated the 3D scene reconstruction 1010 of the scene of the incident. The user 302 has, for example, added several road pieces, features, and landmarks to the 3D scene reconstruction 1010 of the scene of the incident. For example, the user 302 added the 3D representations of a traffic light 1212 and building 1214 and placed them in the appropriate relative location of the intersection of the scene of the incident. Indeed, as shown, the user 302 is manipulating 1218 (e.g., virtually placing) a selected building 1216 into the appropriate relative location at the intersection of the scene of the incident As depicted, the virtual assistant 320 asks the user 302, via utterance 1210, to indicate how many vehicles were involved in the incident. Annotations 1202, 1204, and 1206 appear as floating 3D representations of numeric representations of the user 302. Annotation 1202 is the number one, annotation 1204 is number two, and annotation 1206 indicates three or more. Other implementations may offer more or fewer options and/or utterly different road section options. The user 302 may select the appropriate answer by, for example, touching the correct annotation. For illustration purposes, the user 302 says aloud the number two. That is, the two vehicles were involved in the incident.

Figure 13:
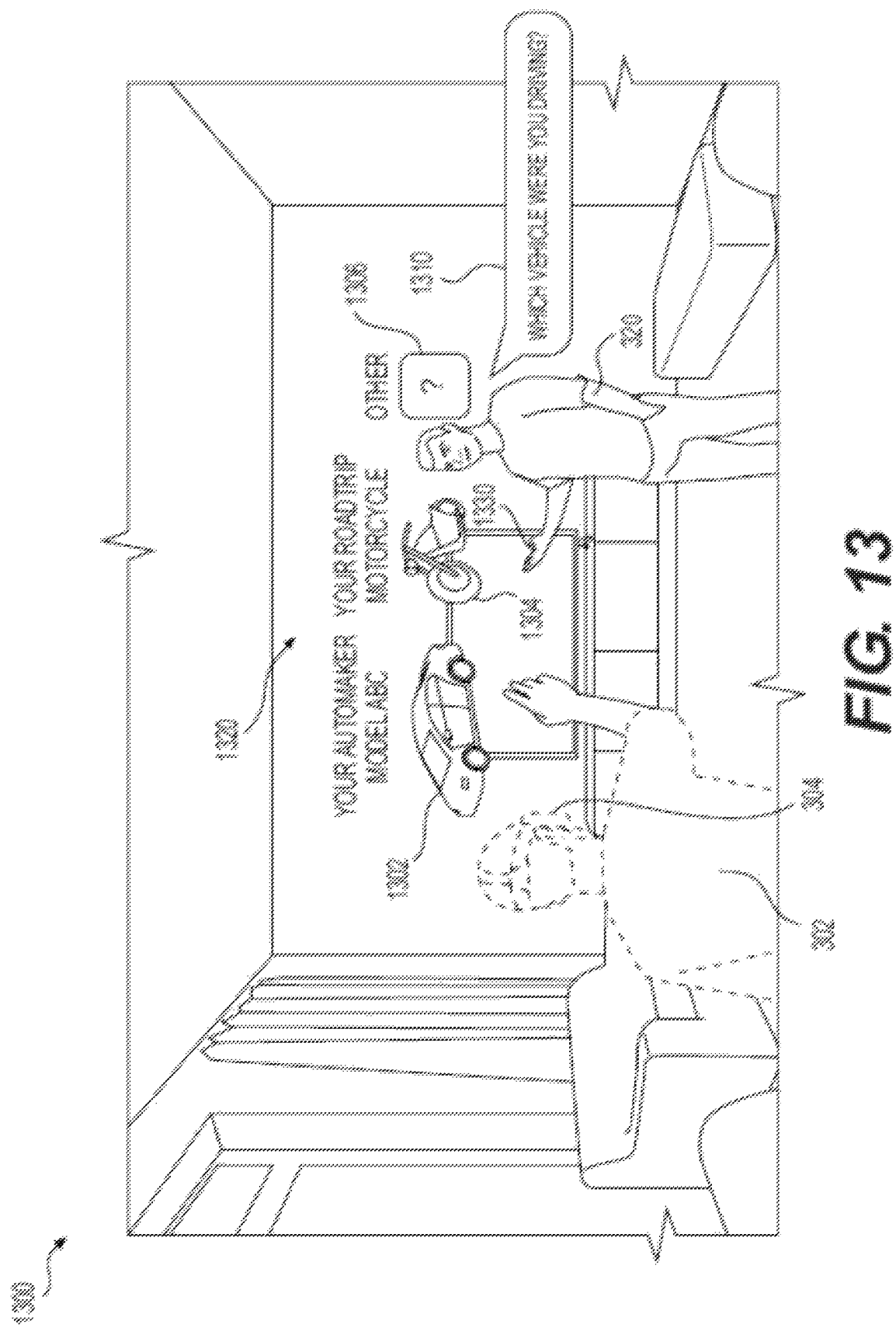

FIG. 13 illustrates a view 1300 of the same environment shown in views 700, 800, and 1100 as may be seen by the user 302 who is wearing the VR/AR/MR rendering device 304. The VR/AR/MR rendering device 304 projects the virtual assistant 320 and a menu 1320 of annotations into this view 1300. The menu 1320 is a listing of the policyholder's vehicles, as depicted as 3D representations.

As depicted, the virtual assistant 320 guides the user 302, via utterance 1310, to select from the menu 1320 which of the policyholder's vehicle was involved in the incident to continue the scene-reconstruction of the incident.

As depicted, the menu 1320 includes several annotations that each appear as floating 3D representations of the policyholder's vehicles in front of the user 302. Annotation 1302 represents an option for "Your Automaker ModelABC," which is presumably the make and model of one of the policyholder's car. Annotation 1304 represents an option for "Your Roadtrip Motorcycle," which is presumably the make of a motorcycle owned by the policyholder. Annotation 1306 represents an option for other options.

The information and the 3D representations of the annotations of the menu 1320 may be found in the internal database 124. More particularly, the insurance company knows the details of the vehicles covered by the policy of the policyholder. Thus, it generates the specific information that identifies the policyholder's vehicles and their 3D representations based on the known details. While it is not shown here, the user 302 picks annotation 1302, which is the option for the car 306 that he was driving during the incident.

Figure 14:
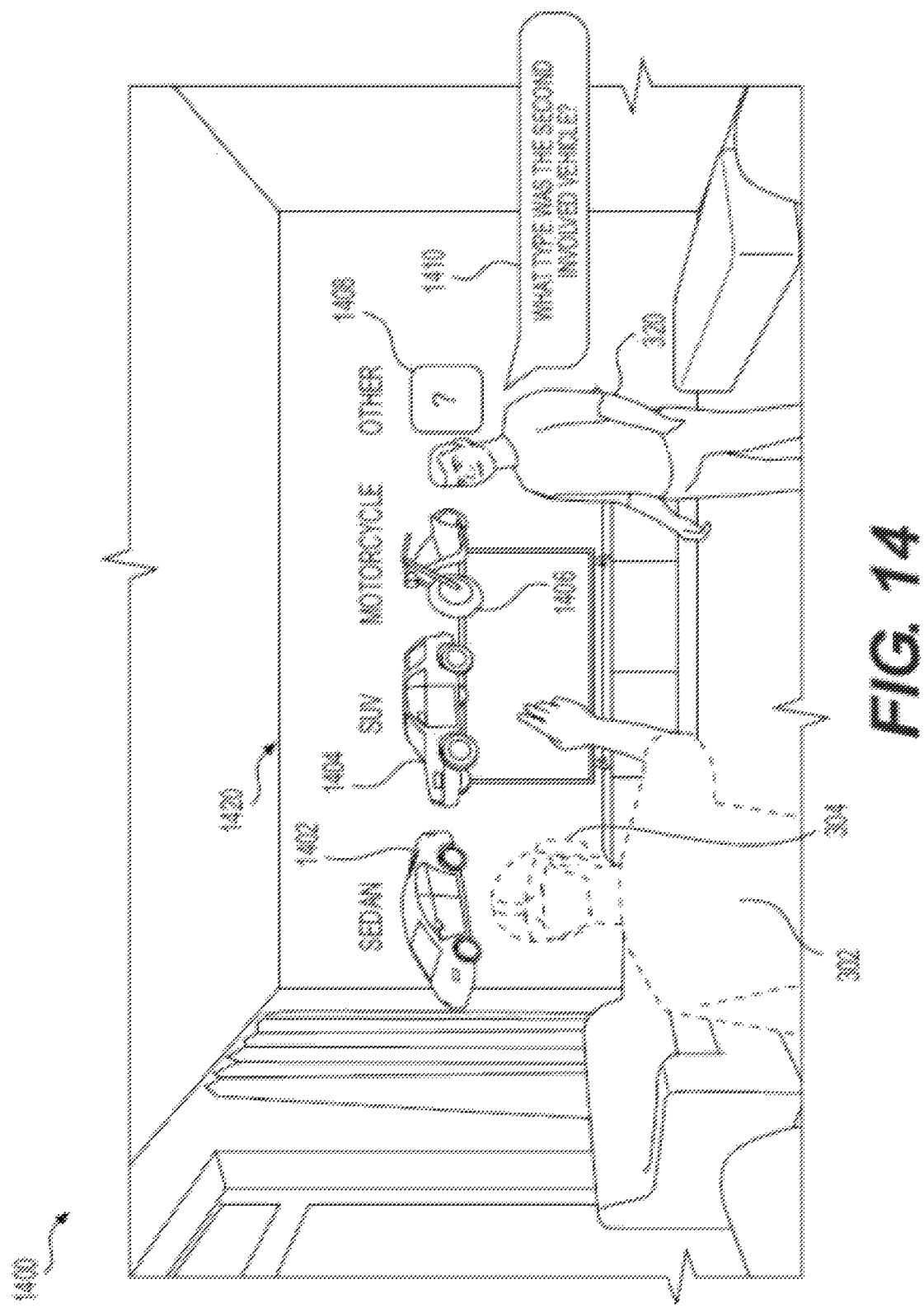

FIG. 14 illustrates a view 1400 of the same environment shown in views 700, 800, 1100, and 1300 as may be seen by the user 302 who is wearing the VR/AR/MR rendering device 304. The VR/AR/MR rendering device 304 projects the virtual assistant 320 and a menu 1420 of annotations into this view 1400. The menu 1420 is a listing of categories of vehicles, as depicted as 3D representations.

As depicted, the virtual assistant 320 guides the user 302, via utterance 1410, to select from the menu 1420, which type of vehicle was the other vehicle that was involved in the incident. The selected vehicle can be used to continue the scene-reconstruction of the incident.

As depicted, the menu 1420 includes several annotations that each appear as floating 3D representations of various vehicle types in front of the user 302. Annotation 1402 represents an option for a sedan. Annotation 1404 represents an option for a sports utility vehicle (SUV). Annotation 1406 represents an option for a motorcycle. Annotation 1408 represents an option for other options. Each of these annotations may offer drop-down listing (like that of drop-down listing 1116) of sub-options to identify the vehicle with particularity.

The information and the 3D representations of the annotations of the menu 1420 may be found in the internal database 124 or external data sources 128. While it is not shown here, the user 302 picks a particular sedan from a drop-down listing of annotation 1402.

FIGS. 15, 16A, 16B, 17A, and 17B illustrate a view 1500 of the same environment shown in views 1000, 1020, 1030, and 1200, as may be seen by the user 302. This view 1500 illustrates actions that may take place after the events shown in views 1000, 1020, 1030, 1100, 1200, 1300, and 1400. In particular, this view 1500 shows the image of a 3D incident reenactment 1630 of the scene of the incident after the selection of vehicles as described above with regard to FIGS. 13 and 14.

The 3D incident reenactment 1630 is based on the 3D scene reconstruction 1010 of the scene of the incident. However, the 3D incident reenactment 1630 is a depiction of the incident over a duration. Thus, the 3D incident reenactment 1630 is the projection of 3D representations of the static objects and dynamic objects. Over the duration of the 3D incident reenactment, the dynamic objects change or move relative to the static objects and/or other dynamic objects. Typically, the vehicles are often dynamic objects. In some instances, a vehicle may remain unchanged or unmoved relative to other objects during an incident reenactment.

Figure 15:
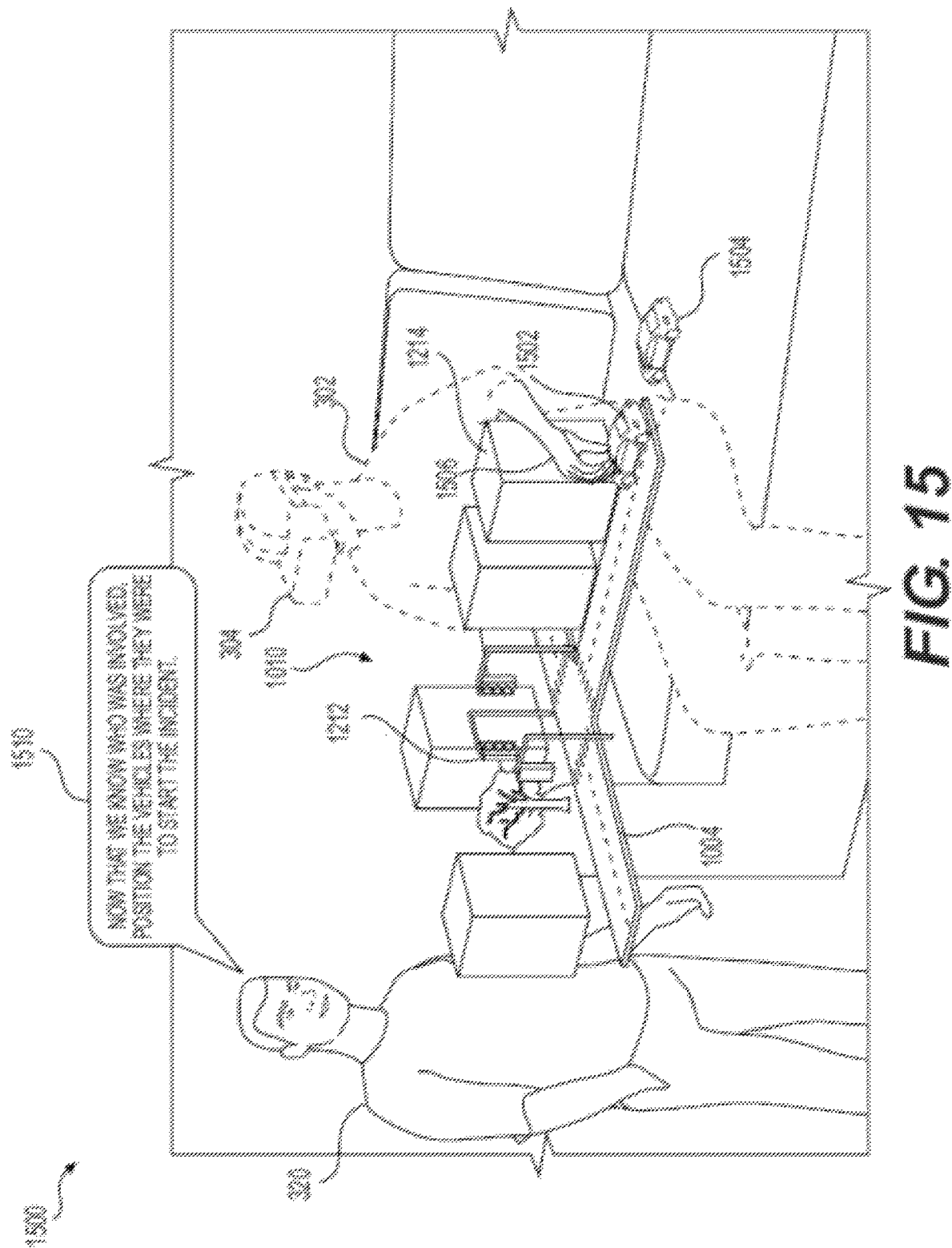

As depicted in FIG. 15, the virtual assistant 320 asks the user 302, via utterance 1510, to manipulate (e.g., position) the vehicles where they were at the start of the incident. In response, the user 302 places selected vehicles into the 3D incident reenactment 1630. For example, the user 302 manipulate 1506 (e.g., virtually places) the 3D representations of an insured vehicle 1502 and the other vehicle 1504 near the building 1214. More particularly, the user 302 virtually places 1506 the vehicle in the appropriate relative locations as they approach the scene of the incident, which is near the intersection.

Figure 16A:
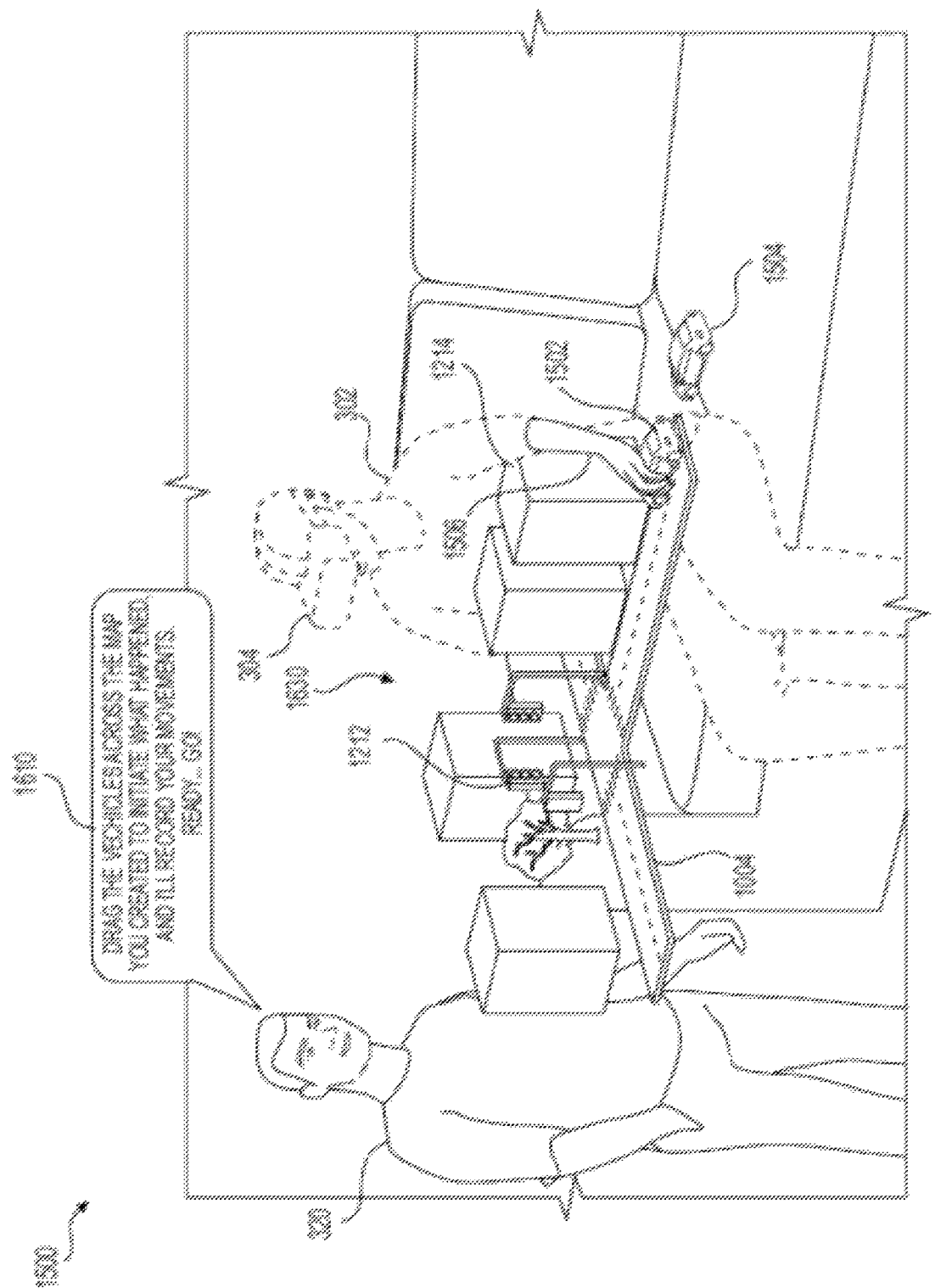

As depicted in FIG. 16A, the virtual assistant 320 asks the user 302, via utterance 1610, to drag the vehicles across the 3D incident reenactment 1630 to show the relative movements and locations of the vehicles during the incident. That is, the user 302 is asked to animate the indecent using the 3D representations of the selected vehicles in the 3D representation of the reconstructed scene.

In some instances, the virtual assistant 320 may prompt the user 302 to move the 3D representation of an insured vehicle 1502 first. Furthermore, the virtual assistant 320 tells the user 302, via utterance 1610, that his movements of the vehicles within the 3D incident reenactment 1630 will be recorded. The prompting may take the form of the VR/AR/MR rendering device 304 providing a message (e.g., utterance 1610) that request input from the user. That requested input includes manipulation of the 3D representations of at least one non-vehicular object (e.g., traffic light 1212) and at least one vehicle (e.g., vehicle 1502), via the VR/AR/MR rendering device 304, as a reenactment of the vehicular incident.

Figure 16B:
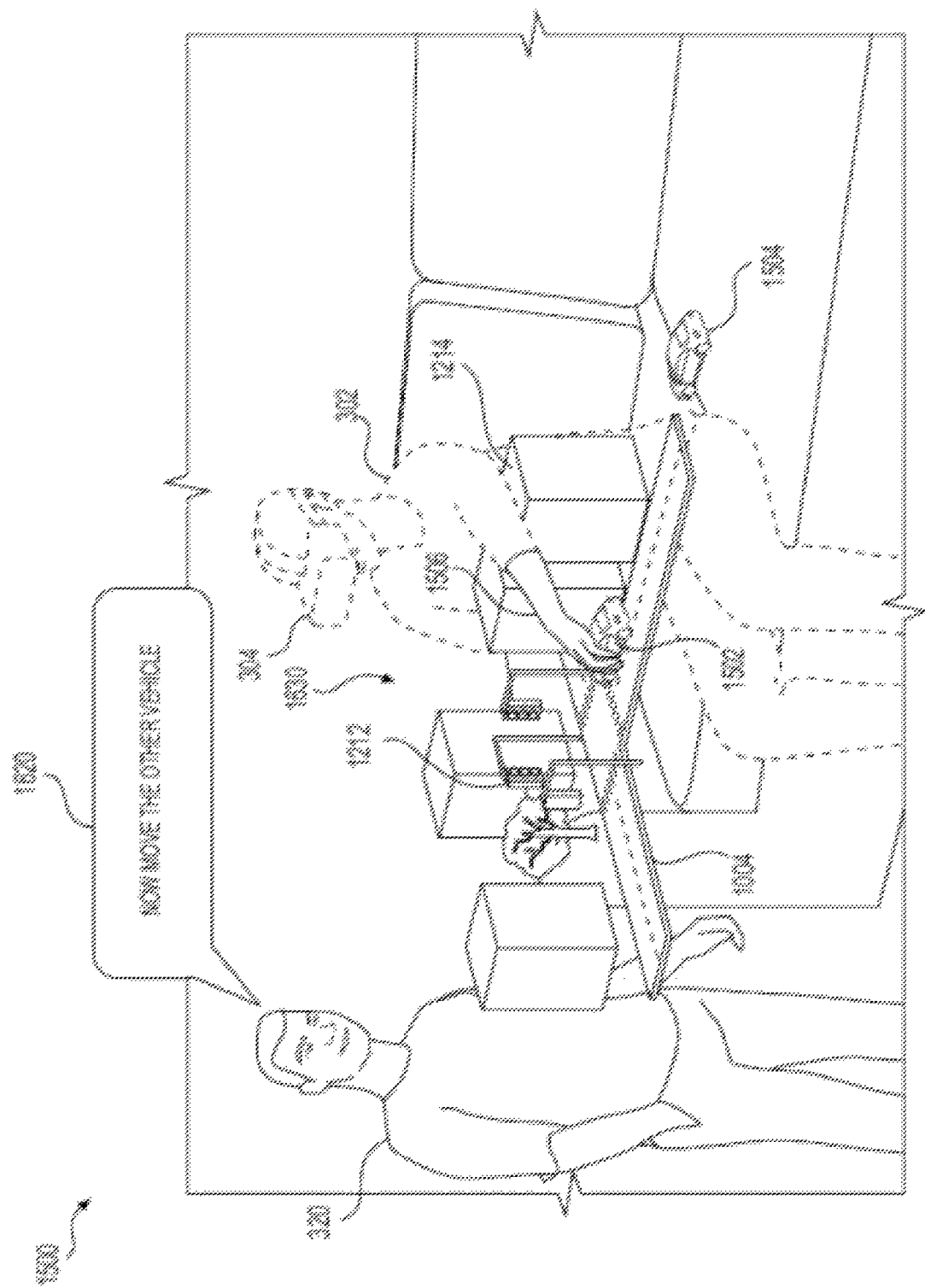

In response to this prompting, as shown in FIGS. 16A and 16B, the user 302 moves the selected vehicles in the 3D incident reenactment 1630. For example, as shown in FIG. 16A, the user 302 manipulates (e.g., virtually moves) the 3D representations of the insured vehicle 1502 and the other vehicle 1504 on the road in front of the building 1214. As shown in FIG. 16B, the user 302 has manipulated the 3D representation of the insured vehicle 1502 along to the crosswalk of the intersection.

Figure 17A:
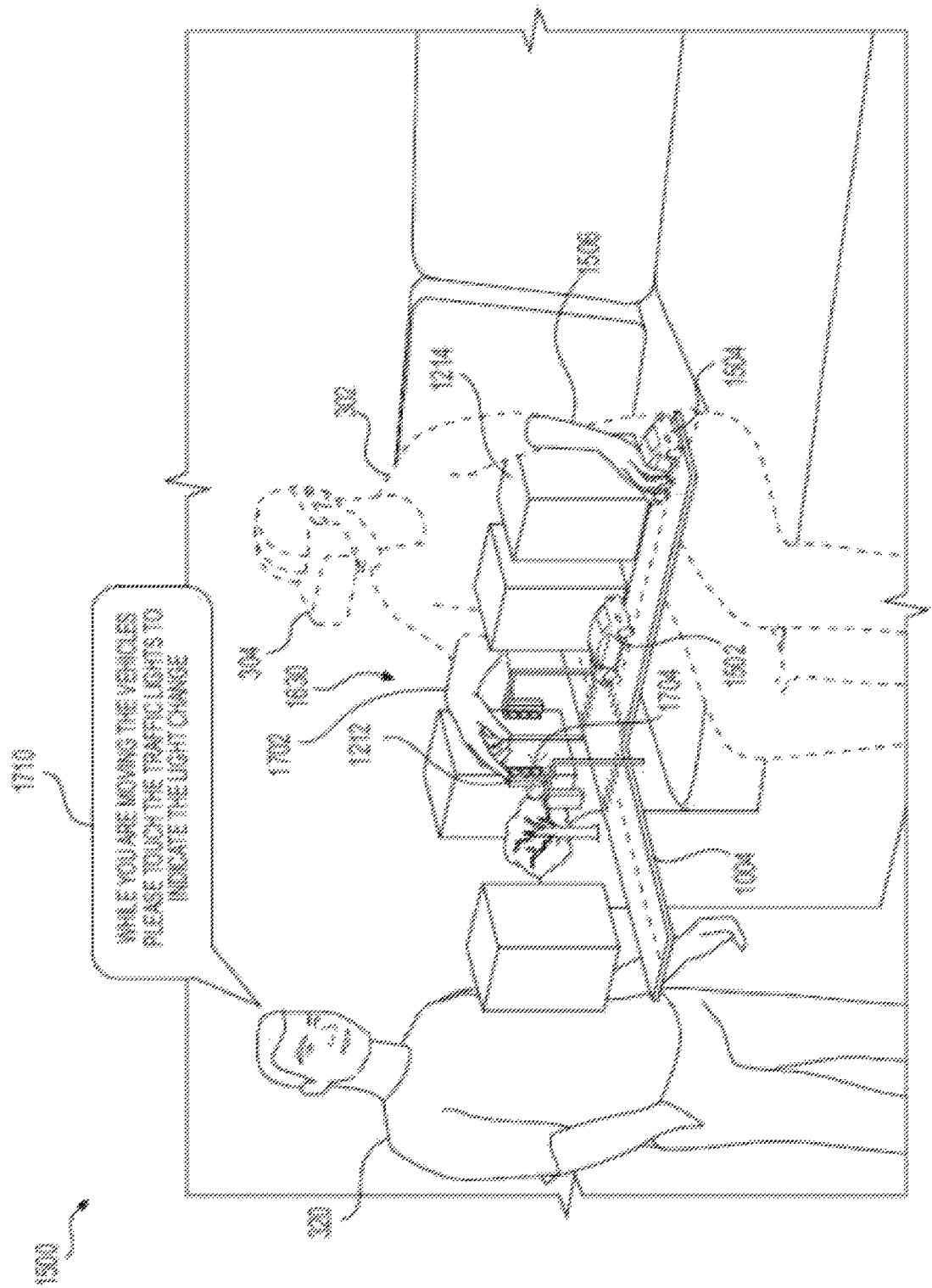

As depicted in FIG. 16B, the virtual assistant 320 tells the user 302, via utterance 1620, to move the 3D representation of another vehicle 1502 next. As depicted in FIG. 17A, the virtual assistant 320 tells the user 302, via utterance 1710, to touch traffic lights while he is moving the vehicles to indicate when the traffic lights changed relative to the location of the vehicles.

In response to these promptings, as shown in FIG. 17A, the user 302 starts to manipulate 1506 (e.g., virtually move) the 3D representation of the other vehicle 1504 on the road in front of the building 1214. While manipulating 1506 the vehicle 1504, the user 302 reaches out with his other hand and virtually touches 1702 the traffic light 1212 facing the vehicles to indicate a light change. The particular light (e.g., red, yellow, green, etc.) can be specified by one or more various factors, including the specific location of the virtual touch 1702 on the traffic light 1212, duration of the virtual touch, and/or a spoken command. In other instances, just a spoken command may specify the type and timing of the traffic light.

As depicted in FIG. 17B, the virtual assistant 320 tells the user 302, via utterance 1720, to stop moving or touching virtual items when he is done. In response to this prompting, as shown in FIG. 17B, the user 302 manipulates 1506 (e.g., virtually moves) the 3D representation of the other vehicle 1504 to intersect (i.e., rear-end) the insured vehicle 1502 just when he touches the traffic light 1212 to turn green.

Figure 18:
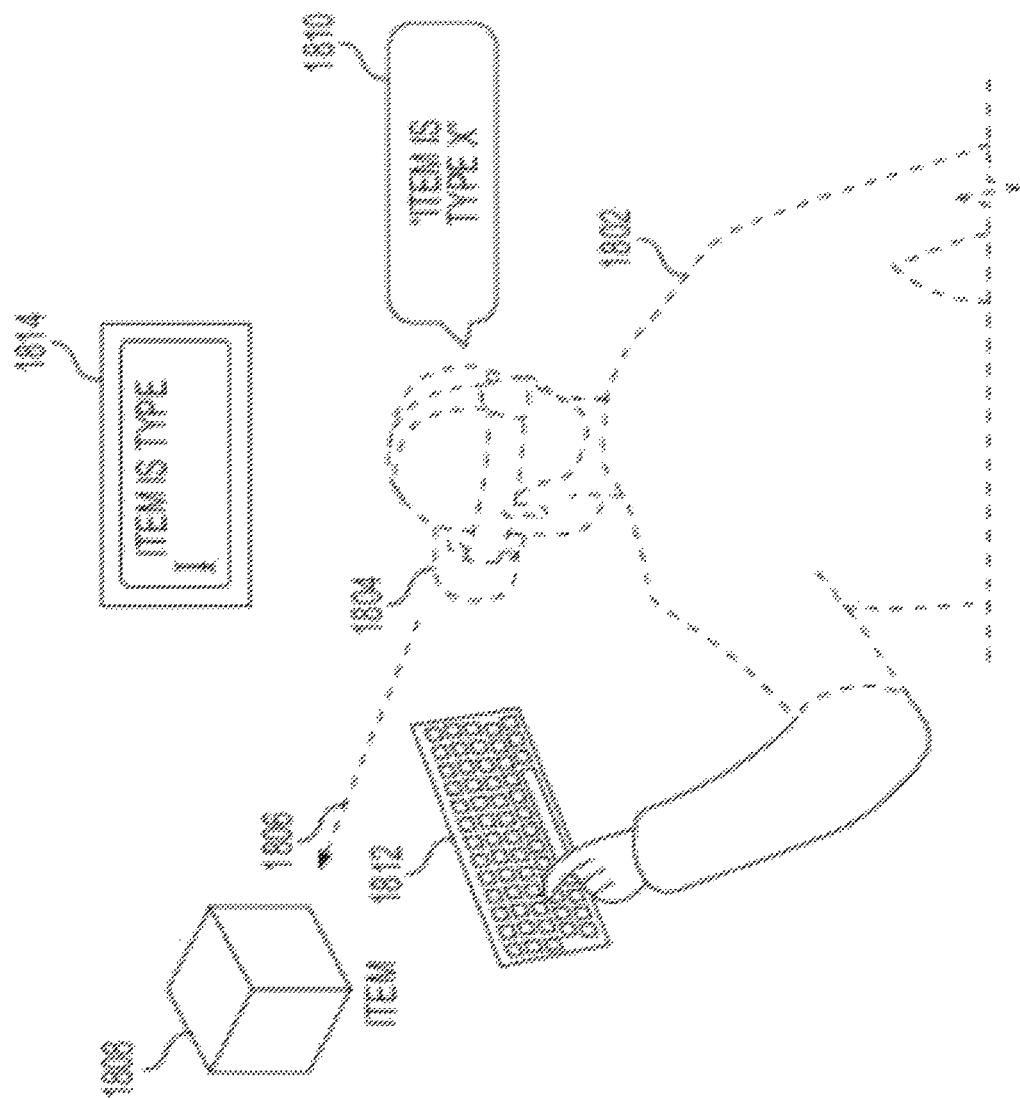
FIGS. 18-19B illustrates a user wearing a head-mounted VR/AR/MR rendering device and providing input to such a device.

FIG. 18 illustrates a user 1802 wearing a head-mounted VR/AR/MR rendering device 1804. As shown in FIG. 18, methods of user input and interaction that are enabled by the VR/AR/MR technology assist in the process of facilitating incident reenactment using 3D representations. The VR/AR/MR rendering device 1804 may be similar to the VR/AR/MR rendering device 304 or to the VR/AR/MR rendering device 104. The VR/AR/MR rendering device 1804 includes functionality to generate pupil data to determine the sight direction 1806 of the user 1802. The sight direction determination functionality may include, for example, an image within the VR/AR/MR rendering device 1804 that may capture an image of the eyes of the user 1802 and a processor to process the captured image to determine a location of the pupils of one or both eyes. From the locations of the pupils, the sight direction 1806 may be determined. In some examples, the VR/AR/MR rendering device 1804 determines the sight direction and, in other examples, the VR/AR/MR rendering device 1804 provides the captured image to the VR/AR/MR processor 102, to perform sight direction.

In the example shown in FIG. 18, the user's sight direction 1806 is toward an item 1808. The VR/AR/MR rendering device 1804 may display the item 1808 to the user 1802 in a highlighted manner or otherwise indicating the item 1808 to the user 1802. Herein, an example item may be a vehicle, landmark, or feature that was involved or may have been involved in the incident.

The user 1802 may also provide information relevant to the item 1808 or ask questions about the item, such as by providing information 1810 about the item 1808. Other means for the user 1802 to provide the information about the item 1808 may be provided. For example, the VR/AR/MR rendering device 1804 may display a virtual keyboard 1812 to the user 1802, and the VR/AR/MR rendering device 1804 may recognize the movement by the user 1802 that indicates the user providing the information 1810 to the VR/AR/MR rendering device 1804 via the virtual keyboard, such as typing information 1814 about the item. The VR/AR/MR rendering device 1804 may provide the information 1814 about the item 1808 and/or the information 1810 to the VR/AR/MR processor 102. In some examples, there may be several items in the user's sight direction 1806, and the VR/AR/MR rendering device 1804 may interact with the user 1802 about each of the items in turn or, for example, allow the user 1802 to select an item about which to interact. The VR/AR/MR processor 102 may utilize the information 1810 to populate entries in a database, such as to populate and/or modify entries in the internal database 124. In some instances, this information 1810 may be used to describe a vehicle or landmark at the scene of the incident, such as scene 620.

Figure 19B:
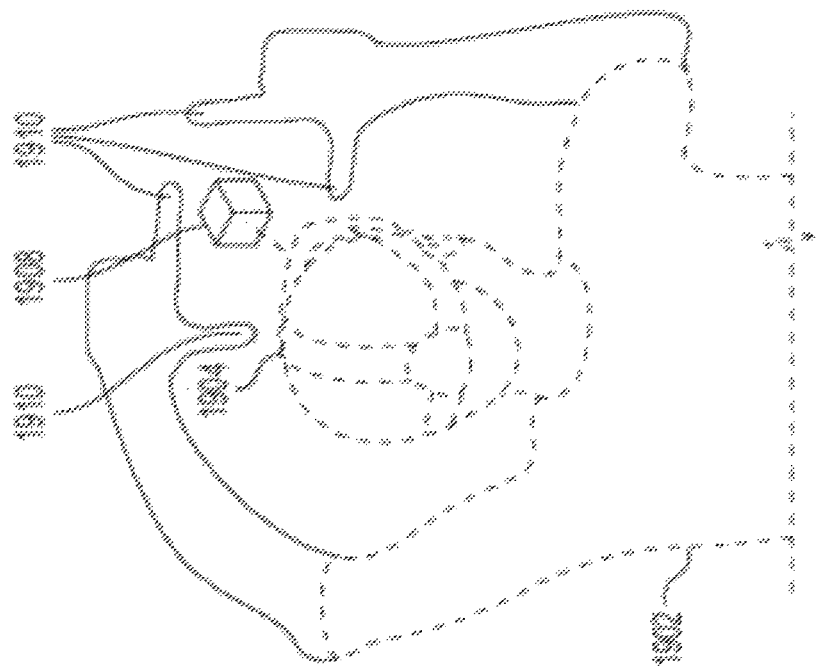
Figure 19A:
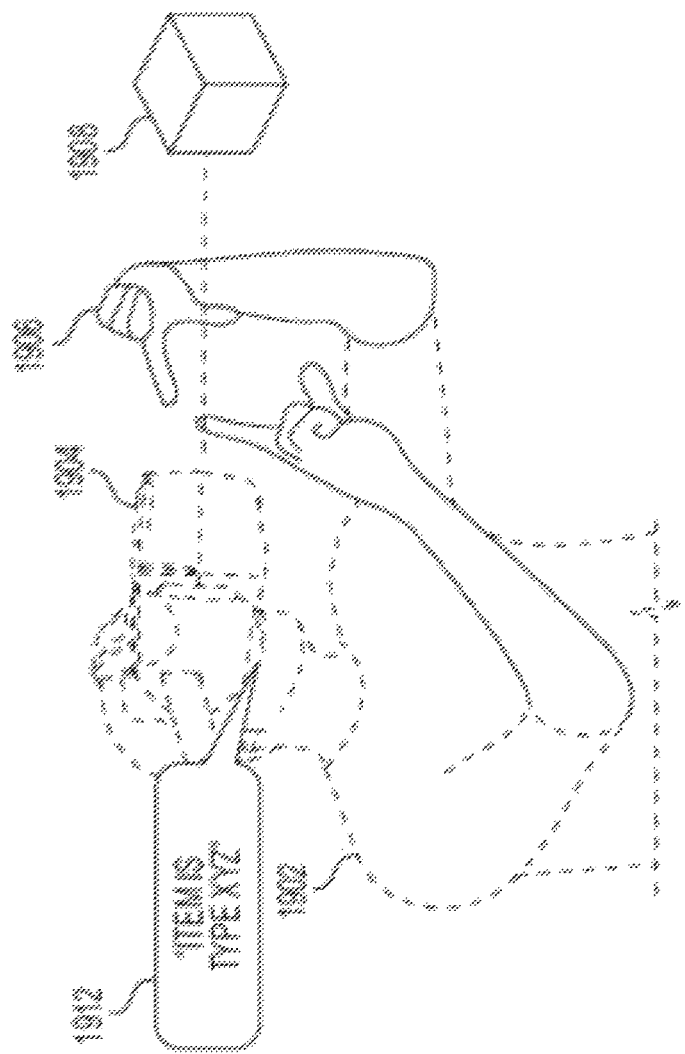

FIG. 19A and FIG. 19B together illustrate a user 1902 wearing a head-mounted VR/AR/MR rendering device 1904. The VR/AR/MR rendering device 1904 may be similar, for example, to the VR/AR/MR rendering device 304 or to the VR/AR/MR rendering device 104. The VR/AR/MR rendering device 1904 may include functionality to detect a gesture 1906 made by the user 1902 relative to an item 1908 in the environment of the user 1902. Herein, an example item may be a vehicle, landmark, or feature that was involved or may have been involved in the incident Using the gesture 1906 and/or other gestures, the user 1902 may interact with the virtual environment in ways that assist in the process of facilitating incident reenactment using 3D representations. In some examples, one or more images including the gesture are provided to the VR/AR/MR processor 102, which has the functionality to detect the gesture 1906. In the example shown in FIG. 19A and FIG. 19B, the user 1902 makes a gesture 1906 by framing the item 1908 in her view with her fingers 1910. This is just an example, and other methods of gesturing are possible, such as pointing or waving. The VR/AR/MR rendering device 1904 may display the item 1908 to the user 1902 in a highlighted manner or otherwise showing that the user 1902 has indicated the item 1908 with the gesture 1906. With the item 1908 being indicated, the user 1902 may provide information relevant to the item 1908, such as by making an utterance 1912 about the item 1908 that includes the information, or otherwise providing the information. The VR/AR/MR rendering device 1904 may provide the information to the VR/AR/MR processor 102. The VR/AR/MR processor 102 may utilize the information to populate entries in a database, such as to populate and/or modify entries in the internal database 124. In some instances, this information 1810 may be used to describe a vehicle or landmark at the scene of the incident, such as scene 620.

Figure 20:
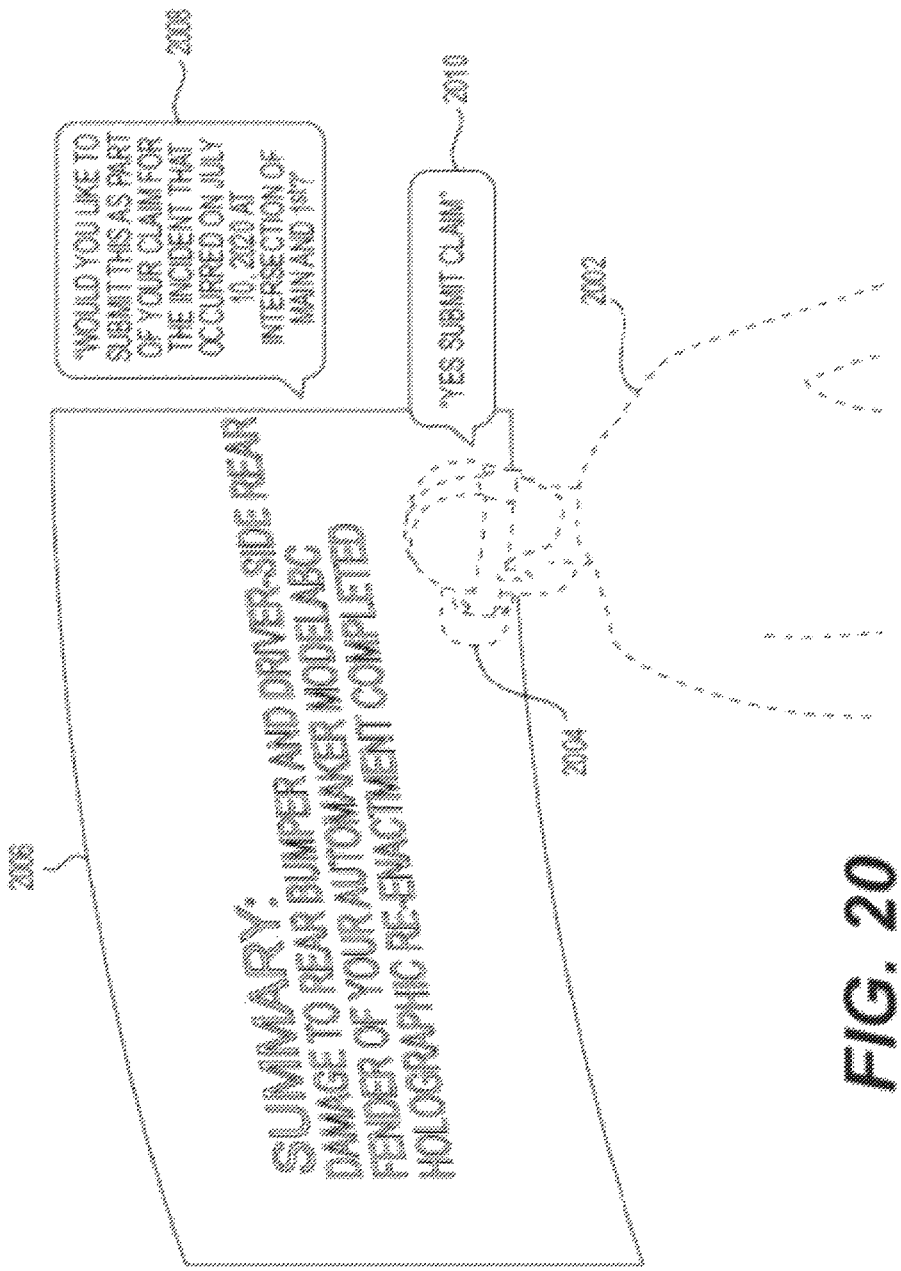
FIG. 20 illustrates a view in which a user is wearing a VR/AR/MR rendering device to facilitate submitting an insurance claim.

FIG. 20 illustrates a view in which a user 2002 is wearing a VR/AR/MR rendering device 2004 to facilitate submitting an insurance claim. The VR/AR/MR rendering device 2004 may be similar to the VR/AR/MR rendering device 104. The VR/AR/MR rendering device 2004 displays to the user 2002 an image that includes a summary listing 2006 of the incident for which an insurance claim may be submitted. The VR/AR/MR rendering device 2004 provides a query 2008, verbally or visually, as to whether the user 2002 would like to submit an insurance claim that includes the incident referenced by the summary 2006. The query 2008 may include additional information, such as the identity of the insured vehicle.

The user 2002 may make an utterance 2010 or otherwise indicate, such as with a gesture, that the insurance claim should be submitted. For example, the VR/AR/MR renderer 2004 may indicate the utterance 2010 to the VR/AR/MR processor 102. The VR/AR/MR processor 102 may provide the information of the insurance claim, such as the reenactment of the incident, via the network 126 to the internal database 124.

Figure 21:
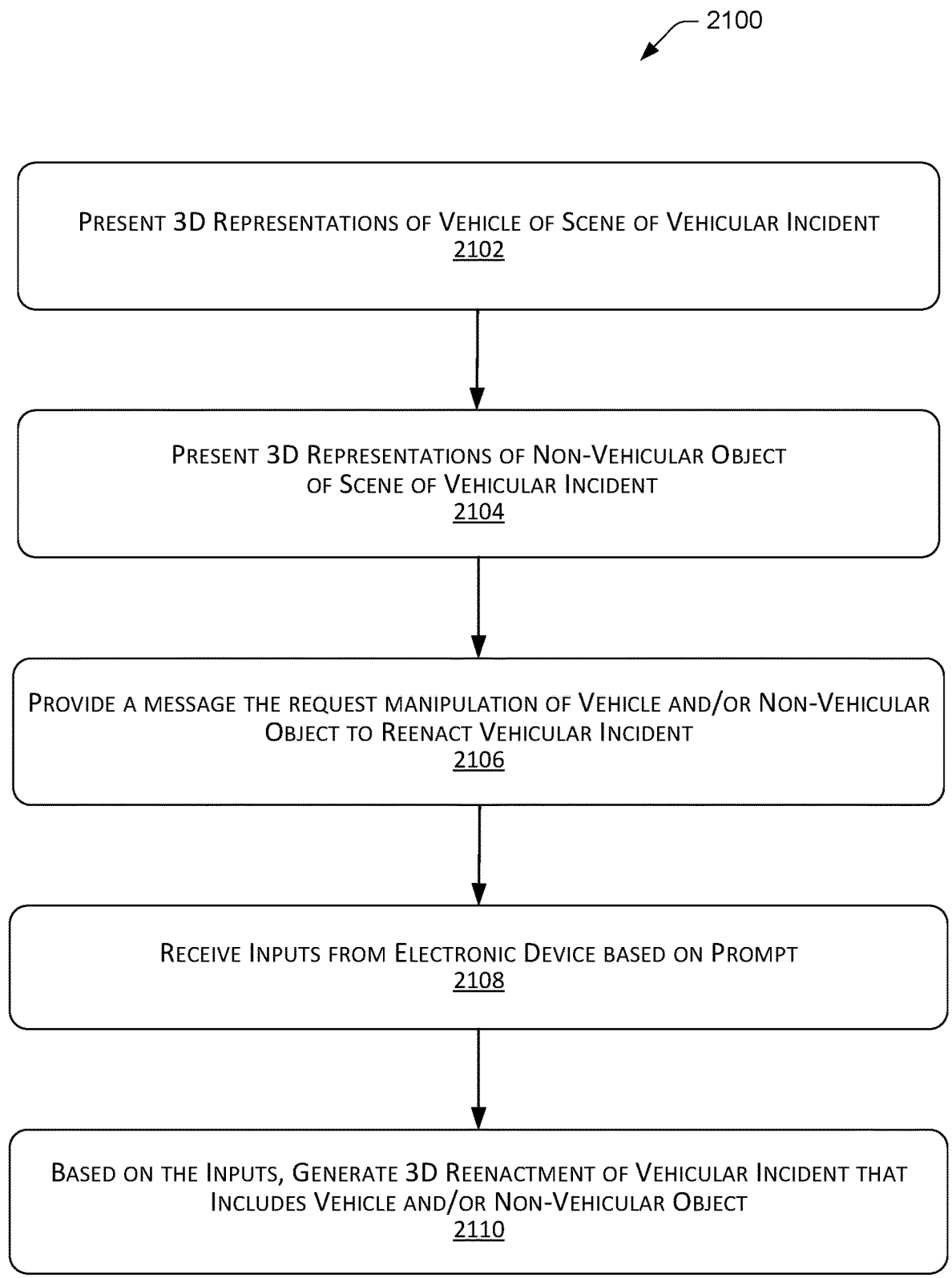
FIG. 21 is a flowchart illustrating a process to provide an immersive environment for a user, to facilitate vehicular incident reenactment using 3D representations.

FIG. 21 is a flowchart illustrating an example process 2100 to provide an immersive environment for a user, to a to facilitate incident reenactment using 3D representations. For ease of illustration, the process 2100 may be described as being performed by a device described herein, such as one or more processors of a VR/AR/MR rendering device. However, the process 2100 may be performed by other devices. Moreover, the devices may be used to perform other processes.

The process 2100 (as well as each process described herein) is illustrated as a logical flow graph, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

At 2102, one or more processors present, on a display of an electronic device, an image including 3D representation of at least one vehicle involved in a vehicular incident. For example, one or more processors of the AR/VR/MR processor 102 may present an image on the AR/VR/MR rendering device 104. That image includes 3D representation of at least one vehicle, such as vehicle 1502, that was involved in a vehicular incident, such as the one that occurred at the actual scene 620 of the incident, which is presumably an intersection nearby the parking lot of environment 300.

FIGS. 13-17B and their associated descriptions illustrate examples of presentations that may be the result of operation 2102 of this process. They depict and describe the presentation of images that include 3D representations of one or more vehicles. Vehicles 1302, 1402, 1502, and 1504 are examples of vehicles that may have been involved in a vehicular incident that has their 3D representations presented by operation 2102.

At 2104, one or more processors present, on the display of the electronic device, the image that also includes 3D representations of at least one non-vehicular object proximate of the vehicular incident. The image includes 3D representation of at least one non-vehicular object, such as traffic light 1212, that was part of the scene of the vehicular incident, such as the one that occurred at the actual scene 620 of the incident, which is presumably an intersection nearby the parking lot of environment 300.

FIGS. 8-12 and 15-17B and their associated descriptions illustrate examples of presentations that may be the result of operation 2104 of this process. They depict and describe the presentation of images that include 3D representations of one or more non-vehicular objects. The non-vehicular objects may be, for example, things or features that may be part of the scene of an incident or nearby the scene of such an incident. For example, a non-vehicular object may be a road, a sidewalk, a traffic light, traffic sign, building, parking lot, railroad track, person, pole, advertisement sign, lane marker, intersection, vegetation, construction materials, construction equipment, walls, landmarks, and the like.

Road pieces 802, 804, 806, 1002, 1004, 1006, traffic light 1102, construction equipment 1104, road features 1106, vegetation 1008, building 1110, other 1112, tree 1118, bush 1120, rock 1122, traffic light 1212, and buildings 1214, 1216 are examples of non-vehicular objects that may have been part of the scene of a vehicular incident that has their 3D representations presented by operation 2104.

At 2106, the one or more processors prompt the user to provide input the manipulate the 3D representations so as to reenact the vehicular incident. This operation may be described as providing a message that requests that the user of the electronic device provide manipulation input. That manipulation input is data representing the user's manipulation of or changes to the 3D representations of the at least one non-vehicular object and/or the at least one vehicle, via the display of the electronic device. This manipulation or changes are done to produce a reenactment of vehicular incident.

For example, one or more processors of the AR/VR/MR processor 102 may present an image on the AR/VR/MR rendering device 104. The presented image may be based, for example, on a point cloud of data. The image may include a 3D representation of a virtual assistant providing guidance and/or prompting the user to take some action that facilitates incident reenactment using 3D representations. Thus, the virtual assistant virtual assistant configured to interact with the user to provide the message of the providing operation 2106.

FIGS. 3-20 and their associated descriptions illustrate examples of promptings or messages that may be result of operation 2106 of this process. The utterances, menus, and annotations are examples of such promptings. More particularly, examples of such include utterances 322, 510, 610, 710, 810, 1140, 1210, 1310, 1410, 1510, 1610, 1620, 1710, 1720, and 2008, annotation menus 1130, 1320, and 1420, and annotations 502, 504, 802, 804, 806, 1002, 1004, 1006, 1102-1112, 1118, 1120, 1122, 1202-1206, 1212-1216, 1302-1306, 1402-1408, and 1502-1504.

In some instances, the presenting operation 2104 includes at least a visual indication of the at least one vehicle by the virtual assistant. For example, FIG. 13 and its accompanying description shows the virtual assistant 320 visually indicating 1330 the vehicles 1302 and 1304.

With many of the examples described herein, the prompting (e.g., messages) includes the projection of an image of an utterance from the virtual assistant 320 that may be combined with the projection of manipulatable and/or selectable annotations. In some instances, the prompting (e.g., messages) may include audio (e.g., verbal instructions or questions) alone or in combination with utterances and/or annotations.

At 2108, the one or more processors receive an input from the user of the electronic device and based at least in part on the message of operation 2106. The input being received via the electronic device, such as the VR/AR/MR rendering device 104. As used herein, an input may, for example, include just one input.

The inputs may be, for example, based upon the user making a gesture (e.g., virtually touching an annotation) and/or speaking a response to the prompt (e.g., message). The input may include, for example, the user 302 virtually touching vegetation annotation 1108 and then virtually touching tree annotation 1118 to select a tree as a non-vehicular object.

As depicted in FIGS. 8-10C and their accompanying descriptions, the user 302 may provide an input (e.g., a first input) to manipulate one or more non-vehicular objects, such as road pieces (e.g., road pieces 802, 804, 806, 1002, 1004, and 1006). The manipulation includes selecting the road pieces by virtually touching one or more of them, virtually grabbing one or more of them, and virtually placing one or more of the road pieces into the 3D scene reconstruction 1010 of the scene of the incident. Since the road pieces will not move or change during the 3D incident reenactment 1630, they are static objects.

As depicted in FIGS. 11-13 and their accompanying descriptions, the user 302 may provide another input (i.e., second input and/or third input) to manipulate one or more non-vehicular objects, such as traffic light 1102, construction equipment 1104, road features 1106, vegetation 1008, building 1110, other 1112, tree 1118, bush 1120, rock 1122. The manipulation includes selecting the object by virtually touching one or more of them, virtually grabbing one or more of them, and virtually placing one or more of the objects into the 3D scene reconstruction 1010 of the scene of the incident. Since these non-vehicular objects will not move or change during the 3D incident reenactment 1630, they are static objects.

As depicted in FIGS. 14-17B and their accompanying descriptions, the user 302 may provide another input (e.g., a third and/or fourth input) to manipulate one or more vehicles, such as the vehicles 1502 and 1504. The manipulation includes selecting the vehicle by virtually touching one or more of them, virtually grabbing one or more of them, virtually placing the vehicles 1502 and 1504 into the 3D scene reconstruction 1010 of the scene of the incident, and virtually moving the vehicles 1502 and 1504 within the 3D incident reenactment 1630. Since these vehicles are moving and/or changing during the 3D incident reenactment 1630, they are dynamic objects.

As used herein, an input may include a plurality of related inputs. As used herein, an inputs may be described as first, second, third, or forth, or so on in order distinguish one input (or group of inputs) from another. This designation is only intended to distinguish one input from other. The label does not indicate priority, hierarchy, ranking, or differences in quality of the input.

At 2110, the one or more processors generate a 3D reenactment of the vehicular incident that includes the 3D representations of the at least one vehicle and/or at least one non-vehicular object. The generation of the 3D reenactment is based, at least in part on the input. The generated 3D reenactment may be presented to the user via the display of the electronic device.

For example, one or more processors of the AR/VR/MR processor 102 may generate and/or present an image of the generated 3D incident reenactment 1630 on the AR/VR/MR rendering device 104.

For example, if the user 302 moves the vehicles 1502 and 1504 in the manner depicted in FIGS. 16-17B and described in their accompanying descriptions, the generated 3D incident reenactment 1630 may show the vehicle 1504 rear-ending the insured vehicle 1502 on the roadway near the intersection.

With the techniques described herein, an inventory of objects in an environment may be more easily and accurately created, such as for use in documenting an insurance claim. Furthermore, changes to objects in an environment may be more accurately determined, which may, for example, assist policyholders in preparing and/or documenting an insurance claim after an incident.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
    by one or more processors,
    presenting, on a display associated with an electronic device, a first image including three-dimensional (3D) representations of at least one vehicle associated with an insurance policy;
    providing a first message via the electronic device, the first message requesting a selection of a 3D representation of a first vehicle represented in the first image and involved in a vehicular incident;
    receiving a first input from the electronic device comprising a first indication of the first vehicle;
    presenting, on the display associated with the electronic device, a second image including the 3D representation of the first vehicle and a 3D representation of at least one non-vehicular object proximate to the vehicular incident;
    determining a portion of the 3D representation of the first vehicle that differs from a historical representation of the first vehicle;
    presenting, on the display associated with the electronic device, a shaded projection on the second image corresponding to the portion of the 3D representation of the first vehicle;
    providing a second message via the electronic device, the second message requesting a selection of a damage status for the portion of the 3D representation of the first vehicle;
    receiving a second input from the electronic device comprising a second indication of the damage status;
    providing a third message via the electronic device, the third message requesting manipulation of the 3D representation of the at least one non-vehicular object and the 3D representation of the first vehicle, via the display, as a reenactment of the vehicular incident;
    receiving a third input from the electronic device and based at least in part on the third message, the third input being received via the electronic device; and
    generating a 3D reenactment of the vehicular incident that includes the 3D representation of the first vehicle and the 3D representation of the at least one non-vehicular object and based at least in part on the second input and the third input.

2. The method of claim 1, wherein the 3D reenactment includes:
    3D representations of static objects that remain unchanged and unmoved relative to each other over a duration of the 3D reenactment, the least one non-vehicular object being one of the static objects; and
    3D representations of dynamic objects that change or move relative to the static objects over the duration of the 3D reenactment, the first vehicle being one of the dynamic objects.

3. The method of claim 2 further comprising,
    by the one or more processors:
    receiving a fourth input from the electronic device and being received via the electronic device; and
    changing the dynamic objects over the duration of the 3D reenactment based at least in part on the fourth input.

4. The method of claim 1 further comprising, by the one or more processors, presenting, on the display of the electronic device, a 3D representation of a virtual assistant configured to interact with a user to provide at least one of the first message, the second message, or the third message.

5. The method of claim 4 further comprising, by the one or more processors and via a network, receiving information regarding the at least one vehicle, wherein the first image further includes a visual indication of the at least one vehicle by the virtual assistant.

6. The method of claim 1, wherein the at least one non-vehicular object comprises one of a road piece, a road, a sidewalk, a traffic light, a traffic sign, a building, a parking lot, a railroad track, a person, a pole, an advertisement sign, a lane marker, an intersection, vegetation, a construction material, an item of construction equipment, a wall, or a landmark.

7. A system, comprising:
    one or more processors; and
    memory coupled to the one or more processors, the memory storing instructions that are executable by the one or more processors to perform operations including:
    presenting, on a display associated with an electronic device, a first image including three-dimensional (3D) representations of at least one vehicle associated with an insurance policy;
    providing a first message via the electronic device, the first message requesting a selection of a 3D representation of a first vehicle represented in the first image and involved in a vehicular incident;
    receiving a first input from the electronic device comprising a first indication of the first vehicle;
    presenting, on the display associated with the electronic device, a second image including the 3D representation of the first vehicle;
    determining a portion of the 3D representation of the first vehicle that differs from a historical representation of the first vehicle;
    presenting, on the display associated with the electronic device, a shaded projection on the second image corresponding to the portion of the 3D representation of the first vehicle;

providing a second message via the electronic device, the second message requesting a selection of a damage status for the portion of the 3D representation of the first vehicle;

receiving a second input from the electronic device comprising a second indication of the damage status;

providing a third message via the electronic device, the third message requesting manipulation of the 3D representation of the first vehicle, via the display, as a reenactment of the vehicular incident;

receiving a third input from the electronic device and based at least in part on the third message, the third input being received via the electronic device; and generating a 3D reenactment of the vehicular incident that includes the 3D representation of the first vehicle and based at least in part on the second input and the third input.

8. The system of claim 7, wherein the second image presented on the display includes a 3D representation of at least one non-vehicular object proximate to the vehicular incident, and the operations further comprise:

providing a fourth message via the electronic device, the fourth message requesting manipulation of the 3D representation of the at least one non-vehicular object, via the display of the electronic device, as part of the 3D reenactment of the vehicular incident; and receiving a fourth input from the electronic device and based at least in part on the fourth message, the fourth input being received via the electronic device, wherein the 3D reenactment of the vehicular incident includes the 3D representation of the at least one non-vehicular object and is further based at least in part on the fourth input.

9. The system of claim 8, wherein the 3D reenactment includes:

3D representations of static objects that remain unchanged and unmoved relative to each other over a duration of the 3D reenactment, the least one non-vehicular object being one of the static objects; and 3D representations of dynamic objects that change or move relative to the static objects over the duration of the 3D reenactment, the first vehicle being one of the dynamic objects.

10. The system of claim 9, the operations further comprising:

receiving a fifth input from the electronic device and being received via the electronic device; and changing the dynamic objects over the duration of the 3D reenactment based at least in part on the fifth input.

11. The system of claim 8, wherein the at least one non-vehicular object comprises one of a road piece, a road, a sidewalk, a traffic light, a traffic sign, a building, a parking lot, a railroad track, a person, a pole, an advertisement sign, a lane marker, an intersection, vegetation, a construction material, an item of construction equipment, a wall, or a landmark.

12. The system of claim 7, the operations further comprising presenting, on the display of the electronic device, a 3D representation of a virtual assistant configured to interact with a user to provide at least one of the first message, the second message, or the third message.

13. The system of claim 12 further comprising, by the one or more processors and via a network, receiving information regarding the at least one vehicle, wherein the first image further includes a visual indication of the at least one vehicle by the virtual assistant.

14. One or more non-transitory computer-readable media storing instructions that, when executed by one or more processors of at least one device, configure the at least one device to perform operations that facilitate vehicular incident reenactment using three-dimensional (3D) representations, the operations comprising:

presenting, on a display associated with an electronic device, a first image including three-dimensional (3D) representations of at least one vehicle associated with an insurance policy;

providing a first message via the electronic device, the first message requesting a selection of a 3D representation of a first vehicle represented in the first image and involved in a vehicular incident;

receiving a first input from the electronic device comprising a first indication of the first vehicle;

presenting, on the display associated with the electronic device, a second image of the 3D representation of the first vehicle;

determining a portion of the 3D representation of the first vehicle that differs from a historical representation of the first vehicle;

presenting, on the display associated with the electronic device, a shaded projection on the second image corresponding to the portion of the 3D representation of the first vehicle;

providing a second message via the electronic device, the second message requesting a selection of a damage status for the portion of the 3D representation of the first vehicle;

receiving a second input from the electronic device comprising a second indication of the damage status;

providing a third message via the electronic device, the third message requesting manipulation of the 3D representation of the first vehicle, via the display, as a reenactment of the vehicular incident;

receiving a third input from the electronic device and based at least in part on the third message, the third input being received via the electronic device; and generating a 3D reenactment of the vehicular incident that includes the 3D representation of the first vehicle and based at least in part on the second input and the third input.

15. The one or more non-transitory computer-readable media of claim 14, wherein the second image presented on the display of the electronic device includes a 3D representation of at least one non-vehicular object proximate to the vehicular incident, the operations further comprise:

providing a fourth message via the electronic device, the fourth message requesting manipulation of the 3D representation of the at least one non-vehicular object, via the display of the electronic device, as part of the 3D reenactment of the vehicular incident; and receiving a fourth input from the electronic device and based at least in part on the fourth message, the fourth input being received via the electronic device, wherein the 3D reenactment of the vehicular incident includes the 3D representation of the at least one non-vehicular object and is further based at least in part on the fourth input.

16. The one or more non-transitory computer-readable media of claim 15, wherein the 3D reenactment includes:

3D representations of static objects that remain unchanged and unmoved relative to each other over a duration of the 3D reenactment, the least one non-vehicular object being one of the static objects; and 3D representations of dynamic objects that change or move relative to the static objects over the duration of the 3D reenactment, the first vehicle being one of the dynamic objects.

17. The one or more non-transitory computer-readable media of claim 16, the operations further comprising:
   receiving a fifth input from the electronic device and being received via the electronic device; and
   changing the dynamic objects over the duration of the 3D reenactment based at least in part on the fifth input.

18. The one or more non-transitory computer-readable media of claim 15, wherein the at least one non-vehicular object comprises one of a road piece, a road, a sidewalk, a traffic light, a traffic sign, a building, a parking lot, a railroad track, a person, a pole, an advertisement sign, a lane marker, an intersection, vegetation, a construction material, an item of construction equipment, a wall, or a landmark.

19. The one or more non-transitory computer-readable media of claim 14, the operations further comprising presenting, on the display of the electronic device, a 3D representation of a virtual assistant configured to interact with a user to assist the user in recreating the vehicular incident as the 3D reenactment.

20. The one or more non-transitory computer-readable media of claim 19 further comprising, by the one or more processors and via a network, receiving information regarding the first vehicle, wherein the second image further includes at least one visual annotation on the 3D representation of the first vehicle by the virtual assistant.

* * * * *